United States Patent
Ogura et al.

(10) Patent No.: US 10,608,570 B2
(45) Date of Patent: Mar. 31, 2020

(54) POWER CONVERTER AND REFRIGERATION AIR CONDITIONER

(71) Applicant: Hitachi-Johnson Controls Air Conditioning, Inc., Tokyo (JP)

(72) Inventors: Yoji Ogura, Tokyo (JP); Kazuhiro Ueta, Tokyo (JP); Kenji Tamura, Tokyo (JP); Wataru Hatsuse, Tokyo (JP)

(73) Assignee: Hitachi-Johnson Controls Air Conditioning, Inc., Tokyo (JP)

(*) Notice: Subject to any disclaimer, the term of this patent is extended or adjusted under 35 U.S.C. 154(b) by 0 days.

(21) Appl. No.: 15/767,200

(22) PCT Filed: Oct. 18, 2017

(86) PCT No.: PCT/JP2017/037720
§ 371 (c)(1),
(2) Date: Apr. 10, 2018

(87) PCT Pub. No.: WO2019/077700
PCT Pub. Date: Apr. 25, 2019

(65) Prior Publication Data
US 2019/0115861 A1  Apr. 18, 2019

(51) Int. Cl.
*H02M 1/42* (2007.01)
*H02M 1/00* (2006.01)
(Continued)

(52) U.S. Cl.
CPC .......... *H02P 27/08* (2013.01); *H02M 1/4225* (2013.01); *H02M 5/458* (2013.01);
(Continued)

(58) Field of Classification Search
CPC .......... H02M 1/36; H02M 2001/0032; H02M 2001/0035; H02M 2001/0067; H02M 2001/008; H02P 27/08; H02P 5/74
See application file for complete search history.

(56) References Cited

U.S. PATENT DOCUMENTS 6,320,772 B1 * 11/2001 Doyama ............. H02M 1/4208
363/127
6,400,107 B1  6/2002 Nakatani et al.
(Continued)

FOREIGN PATENT DOCUMENTS

CN  102449892 A  5/2012
CN  104885351 A  9/2015
(Continued)

OTHER PUBLICATIONS

Taiwanese Office Action received in corresponding Taiwanese Application No. 106146183 dated Sep. 6, 2018.
(Continued)

*Primary Examiner* — Nguyen Tran
*Assistant Examiner* — David A. Singh
(74) *Attorney, Agent, or Firm* — Mattingly & Malur, PC

(57) ABSTRACT

A boosting operation of a converter and the intermittent energization operation of an inverter are optimally performed in accordant with input or output. The power converter includes the converter capable of boosting a DC voltage outputted by switching operation alternately performing shorting and rectification; the inverter; an inverter capable of performing intermittent energization in which switching around zero cross of a motor current is turned off upon converting the DC voltage outputted by the converter into three-phase AC power; and a controller that controls the converter to perform boosting operation and the inverter to
(Continued)

perform the boosting operation of the converter and the intermittent energization operation of the inverter linkingly.

4 Claims, 17 Drawing Sheets

(51) Int. Cl.
    *H02M 1/36*     (2007.01)
    *H02P 27/08*     (2006.01)
    *H02P 5/74*     (2006.01)
    *H02M 5/458*     (2006.01)
    *H02M 7/219*     (2006.01)

(52) U.S. Cl.
    CPC ............ *H02M 5/4585* (2013.01); *H02P 5/74* (2013.01); *H02M 1/36* (2013.01); *H02M 2001/007* (2013.01); *H02M 2001/0035* (2013.01); *H02M 2001/0058* (2013.01); *H02M 2007/2195* (2013.01)

(56) References Cited

U.S. PATENT DOCUMENTS

| | | | | |
|---|---|---|---|---|
| 6,437,515 | B1* | 8/2002 | Kamoi | H05B 41/2883 315/209 R |
| 2006/0275137 | A1* | 12/2006 | Kempfer | F04D 13/06 417/44.1 |
| 2007/0216323 | A1* | 9/2007 | Ishikawa | B60L 15/007 318/9 |
| 2007/0278986 | A1* | 12/2007 | Okamura | B60K 6/365 318/798 |
| 2008/0223059 | A1* | 9/2008 | Escanes Garcia | F25B 49/025 62/230 |
| 2012/0049774 | A1* | 3/2012 | Takamatsu | B60L 15/007 318/400.3 |
| 2012/0069613 | A1* | 3/2012 | Nakagawa | H02M 7/53871 363/78 |
| 2013/0058144 | A1 | 3/2013 | Hiramatsu et al. | |
| 2014/0361757 | A1* | 12/2014 | Sunahara | H02M 3/1588 323/282 |
| 2015/0195896 | A1* | 7/2015 | Yuzurihara | H05H 1/46 315/111.21 |
| 2017/0187317 | A1* | 6/2017 | Nakano | F04B 39/00 |

FOREIGN PATENT DOCUMENTS

| | | |
|---|---|---|
| CN | 106160535 A | 11/2016 |
| EP | 2 369 049 A1 | 9/2011 |
| EP | 2 924 861 A1 | 9/2015 |
| EP | 3182574 A1 | 6/2017 |
| JP | 2001-245487 A | 9/2001 |
| JP | 2003-250298 A | 9/2003 |
| JP | 2004-048886 A | 2/2004 |
| JP | 2011-205723 A | 10/2011 |
| JP | 5718474 B2 | 5/2015 |
| JP | 2015-171282 A | 9/2015 |
| JP | 2017-112776 A | 6/2017 |
| TW | 201330479 A1 | 7/2013 |
| WO | 2013/042437 A1 | 3/2013 |

OTHER PUBLICATIONS

Kiyoshi Sakamoto, et al., "A Simplified Vector Control of Position Sensorless Permanent Magnet Synchronous motor for Electrical household Appliances," IEEJ Trans. IA, 2004, vol. 34, No. 11, pp. 1133-1140.

Kazuaki Tobari, et al., "Examination of New Vector control Systemof Permanent Magnet Synchronous Motor for High-Speed Drives," The Institute of Electrical Engineers of Japan, 2009, pp. 36-45.

International Search Report and Written Opinion of PCT/JP2017/037720 dated Jan. 16, 2018.

Chinese Office Action received in corresponding Chinese Application No. 201780003497.4 dated Nov. 14, 2019.

\* cited by examiner

POWER CONVERTER AND REFRIGERATION AIR CONDITIONER

TECHNICAL FIELD

The present invention relates to a power converter and a refrigeration air conditioner.

BACKGROUND ART

A converter circuit for converting a single-phase AC voltage into a DC voltage repeats, in response to an output, an operation of storing energy in a reactor by short-circuiting through the reactor and discharging the energy in the reactor during rectifying operation. According to this, the converter circuit boosts the DC voltage to have high efficiency and high output of a permanent magnetic synchronous motor.

Further, an inverter circuit converts the DC voltage into three-phase AC power to drive the permanent synchronous motor and performs an intermittently energization control in which switching around a current zero cross is turned off. According to this, the power converting circuit and the permanent magnet synchronous motor are aimed to have high efficiencies. In other words, the boosting operation of the converter circuit and the intermittent energization operation of the inverter are performed in accordance with the input and the output to have high efficiency of the power converter.

Further, a cost reduction in the power converter can be provided by driving a plurality of motors with a single microcomputer. However, when a single microcomputer performs operations, the microcomputer may not able to control the converter circuit and the inverter circuit.

PRIOR ART

Patent Document

Patent Document 1: JP 5718474

SUMMARY OF INVENTION

Problem to be Solved by Invention

PATENT DOCUMENT 1 disclosed only the intermittent energization operation on an inverter circuit side. In this configuration, the intermittent energization operation may be performed independently from the operation on the converter circuit side. In other words, when the operation is performed by a single microprocessor, there is a possibility in that the motor cannot be controlled due to increase in the operation load. Accordingly, it is efficient that the boosting operation and the intermittent energization control are performed linkingly in accordance with output conditions to reduce the operation load.

An aspect of the present invention provides a power converter and a refrigeration air conditioner using the same to optimally perform the boosting operation of the power converter and the intermittent energization operation of the inverter in accordance with the input and the output.

Means for Solving Problem

To solve the problem, the power converter according to the present invention includes a converter capable of boosting a DC voltage by a switching operation alternately performing short-circuiting and rectification through a reactor in a power source, an inverter capable of an intermittent energization to make switching around zero cross of a motor current OFF while a DC voltage outputted by the converter is converted into three-phase AC power, and a controller for performing the boosting operation of the converter and the intermittent energization operation of the inverter interlockingly.

Other means are described in the descriptions of the embodiments below.

According to the configuration of the present invention, a high efficiency power converter can be driven in which the boosting operation of the converter and the intermittent energization operation of the inverter are optimally performed in accordance with the input and the output.

Advantageous Effect of Invention

According to the present invention, a power converter and a refrigeration air conditioner using the power converter to optimally perform the boosting operation of the converter and the intermittent energization operation of the inverter in accordance with the input and the output.

MODES FOR CARRYING OUT INVENTION

Embodiments according to the present invention are described below, referring to drawings.

Figure 1:
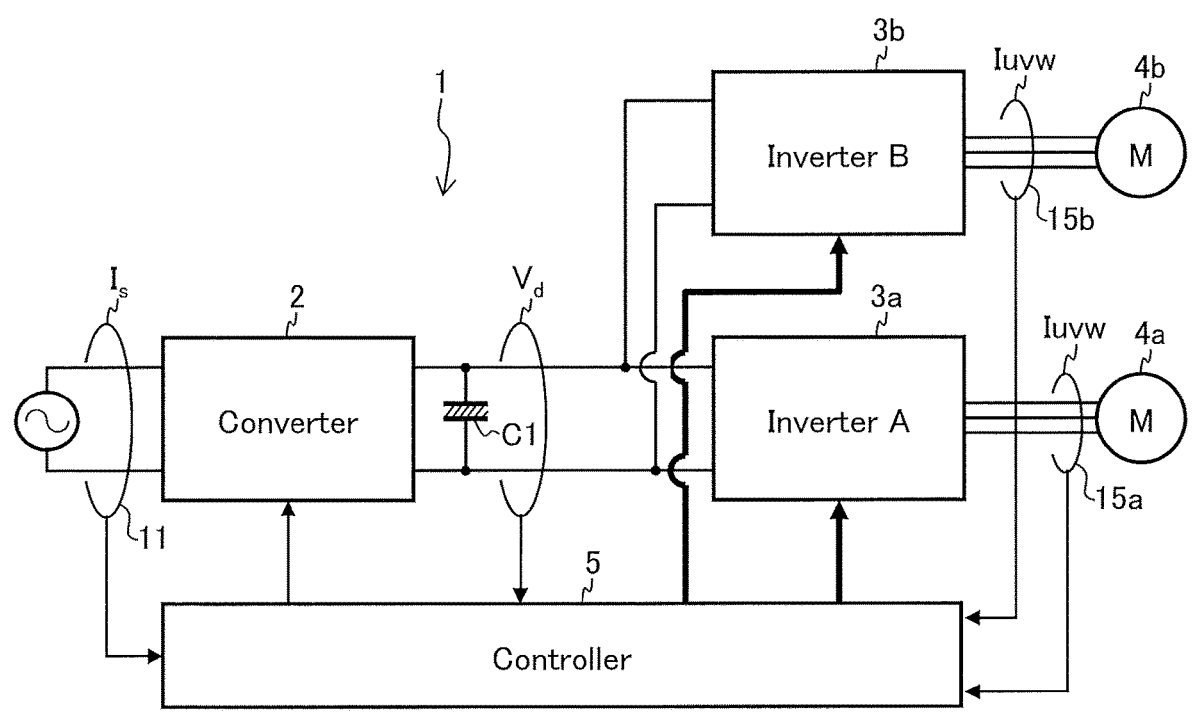
FIG. 1 is a general block diagram showing a power converter according to embodiments of the present invention.

FIG. 1 is a general block diagram showing a power converter 1 according to the present embodiment.

The power converter 1 includes a converter 2 connected to a AC power source VS, an inverter 3a, and a motor 4a, an inverter 3b, and a motor 4b, and a controller 5 for integrally controlling them. The power converter 1 further includes a current detector 11, a smoothing capacitor C1, phase current detectors 15a, 15b. The power converter 1 is installed in the air conditioning device. On the drawing, the inverter 3a is referred to as "an inverter A", and the inverter 3b is referred to as "an inverter B".

The converter 2 converts a power supply voltage into a DC voltage and can boost the DC voltage outputted by the switching operation performing short circuiting through a coil in the power supply and rectification alternately. The inverter 3a is provided to rotationally drive the motor 4a with conversion of the DC voltage into an AC voltage. The motor 4a is a fan motor for rotating a fan of the air conditioning device. The inverter 3b converts the DC voltage into AC voltages to drive the motor 4b. The motor 4b is a motor for a compressor to drive the compressor of the air conditioning device. Further, the inverter 3a and the inverter 3b have similar circuit configurations and drive the motors 4a 4b to rotate by the similar control.

The controller 5 controls the converter 2 on the basis of a circuit current $i_s$ detected by the current detector 11, and a DC voltage Vd outputted by the converter 2. The controller 5 further controls the inverters 3a, 3b on the basis of the current information and the voltage information detected by the phase current detectors 15a, 15b. The controller 5 can control the converter 2 to perform a boosting operation and the inverters 3a, 3b to perform the intermittent energization operation linkingly.

Referring to FIGS. 2 to 14, configurations and operations of the converter 2 and the controller 5 are described below. Further, referring to FIGS. 15 to 19, configurations and operations of the inverter 3a and the controller 5 are described below.

Figure 2:
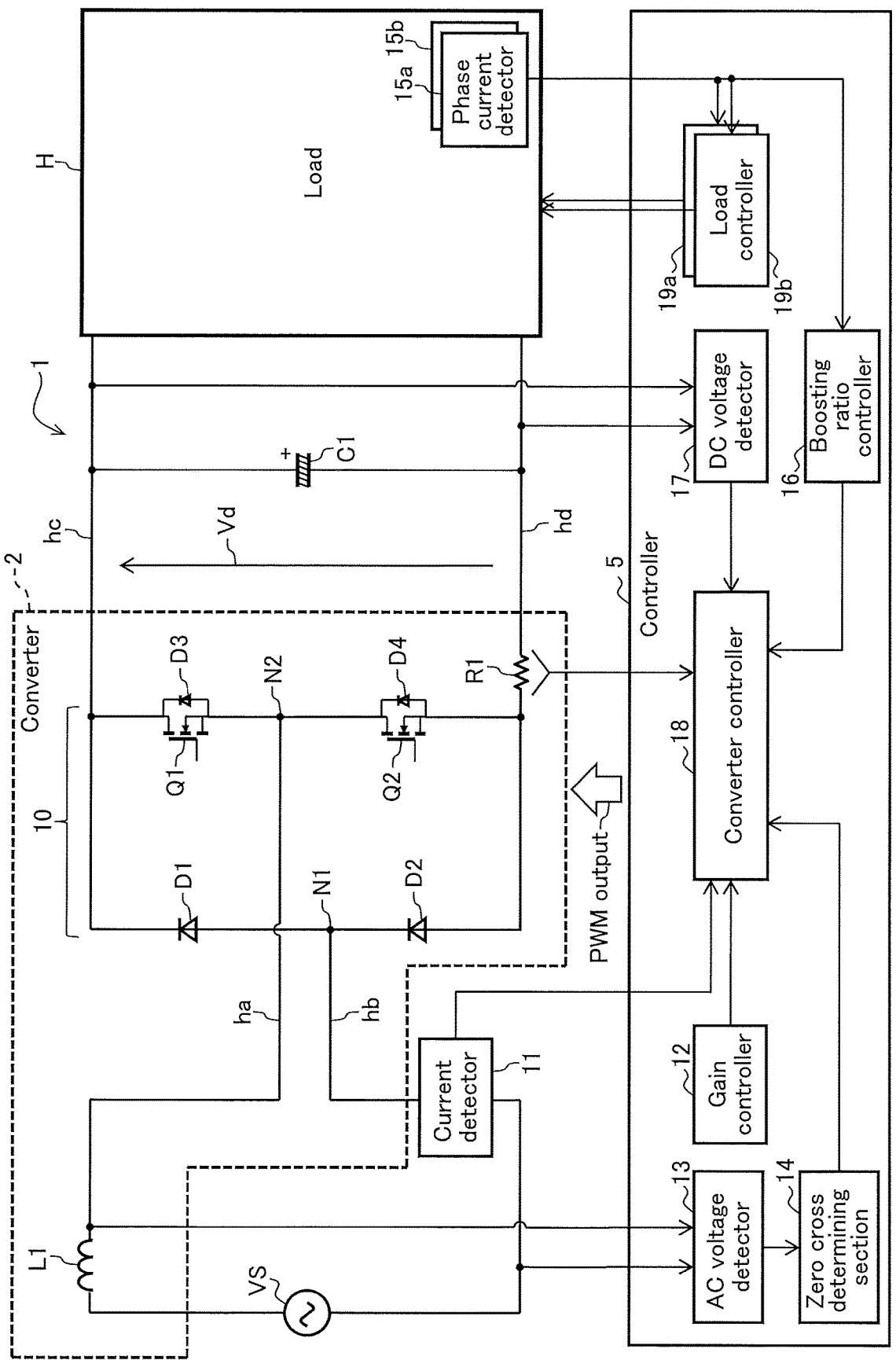
FIG. 2 is a general block diagram showing a converter and a controller.

FIG. 2 is a general block diagram showing the converter 2 and the controller 5, etc.

As shown in FIG. 2, the converter 2 converts an AC power source Vs supplied from the AC power source VS into the DC voltage Vd to supply the DC voltage Vd to a load H (inverters, motors, etc). The converter 2 is connected at an input side thereof to the AC power source VS and an output side thereof is connected to the load H.

The converter 2 includes a reactor L1, the smoothing capacitor C1, diodes D1, D2, D3, D4, MOSFETs Q1, Q2, which are switching elements, and a shunt resister R1. The diodes D1, D2, D3, D4 and the MOSFETs Q1, Q2 form a bridge rectifying circuit 10.

The MOSFETs Q1, Q2 are switching elements, and the diode D3 is a parasitic diode of the MOSFET Q1. The diode D4 is a parasitic diode of the MOSFET Q2. Further, saturation voltages of the MOSFET Q1 and the MOSFET Q2 are lower than forward voltage drops of the diode D3 and the parasitic diode D4.

The diodes D1, D2 and the MOSFETs Q1, Q2 are connected in a bridge. An anode of the diode D1 is connected to a cathode of the diode D2, and a junction point N1 is connected to one terminal of the AC power source VS through a wiring hb.

A source of the MOSFET Q1 is connected to a drain of the MOSFET Q2. The source of the MOSFET Q1 is connected to another terminal of the AC power source VS through a junction N2, a wiring ha, and the reactor L1.

An anode of the diode D2 is connected to a source of the MOSFET Q2.

A drain of the MOSFET Q1 is connected to a cathode of the diode D1.

Further, the cathode of the diode D1 and the drain of the MOSFET Q1 are connected to a positive terminal of the smoothing capacitor C1 and one terminal of the load H through a wiring hc. Further, the diode D2 and the source of the MOSFET Q2 are connected to a negative terminal of the smoothing capacitor C1 and another terminal of the load H through the shunt resister R1 and the wiring hd.

The reactor L1 is disposed in the wiring ha, i.e., between the AC power source VS and the bridge rectifying circuit 10. The reactor L1 stores an electric power supplied from the AC power source VS as energy and discharges the energy, which provides boosting.

The smoothing capacitor C1 smoothes a voltage generated by rectifying through the diode D1 and the MOSFET Q1 into the DC voltage Vd. The smoothing capacitor C1 is connected to an output side of the bridge rectifying circuit 10. i.e., a positive side is connected to the wiring hc, and a negative side is connected to a wiring hd.

The MOSFETs Q1, Q2, which are the switching elements, are controlled between ON and OFF in accordance with a command from a converter controller 18 described later. Use of the MOSFETs Q1, Q2 as switching elements provides a high speed switching. Further, flowing a current through the MOSFET having a small voltage drop allows so-called synchronizing rectifying control, which reduces a circuit conduction loss.

In addition, superjunction MOSFETs, having a low ON resistance, are used as the MOSFETs Q1, Q2, which can further reduce the conduction loss. Incidentally, the parasitic diode of the MOSFET generates a reverse recovery current when a reverse voltage is applied by short-circuit operation. Particularly, the parasitic diode of the superjunction MOSFET has a reverse recovery current which is larger than that of parasitic diodes of general MOSFETs, which is a problem in that the switching loss is large. Accordingly, MOSFETs having a short reverse recovery time (trr: Reverse Recovery Time) are used as the MOSFETs Q1, Q2, which can reduce the switching loss.

As the diodes D1, D2, it is preferable that diodes having small forward voltage drop are selected because the diodes D1, D2 do not generate the reverse recovery current even in active operation thereof. For example, it is possible to reduce a circuit conduction loss by using a general rectifying diode, or a Schottky barrier diode having a high AC voltage resistance.

The shunt resister R1 has a function of detecting a momentary current flowing in the circuit.

The converter 2 is controlled by the controller 5. The controller 5 includes a gain controller 12, an AC voltage detector 13, a zero-cross determining section 14, a boosting ratio controller 16, a DC voltage detector 17, the converter controller 18, and load controllers 19a, 19b. The controller 5 receives sensor information from the current detector 11, and the phase current detectors 15a, 15b.

The current detector 11 has a function of detecting an average current flowing in the circuit.

The gain controller 12 has a function of controlling a current control gain Kp determined from a circuit current root-mean-square value Is and a DC voltage boosting ratio a. In this operation, controlling Kp×Is to a predetermined value provides boosting from the AC power source voltage Vs to a DC voltage which is a-times the DC voltage Vd.

The AC voltage detector 13 is a detector for detecting the AC power source voltage Vs applied from the AC power source VS and connected to the wirings ha, hb. The AC voltage detector 13 supplies the detection value to the zero-cross determining section 14.

The zero-cross determining section 14 has a function of determining whether a polarity of the value of the AC power source voltage Vs detected by the AC voltage detector 13 changes, i.e., whether the AC power source voltage Vs reaches a zero-cross point. The zero-cross determining section 14 is a polarity detector detecting the polarity of the AC power source voltage Vs. For example, the zero-cross determining section 14 supplies, to the converter controller 18, a signal of '1' in a period in which the AC power source voltage Vs is positive and a signal of '0' in a period in which the AC power source voltage Vs is negative.

The phase current detectors 15a, 15b includes, for example, shunt resistors (not shown) to detect currents flowing through the load H. Since the loads H are the inverters 3a, 3b and the motors 4a, 4b, rotating speeds and applied voltage of the motors 4a, 4b are calculated using the load current detected by the phase current detectors 15a, 15b. Further, it is also possible to calculate modulation factors of the inverters 3a, 3b from the DC voltage Vd detected by the DC voltage detector 17 and the applied voltage of the motors 4a, 4b. The phase current detectors 15a, 15b supply the detected values (currents, motor rotating speeds, modulation factors, etc) to the boosting ratio controller 16 and the load controllers 19a, 19b.

The boosting ratio controller 16 selects one of boosting ratios a of the DC voltages Vd from the detection values of the phase current detectors 15a, 15b and supplies the selected results to the converter controller 18. The converter controller 18 performs switching control by supplying driving pulses to the MOSFETs Q1, Q2 to perform switching control to boost the DC voltage Vd to target voltages.

The DC voltage detector 17 is a sensor for detecting the DC voltage Vd applied to the smoothing capacitor C1, and a positive side thereof is connected to the wiring he and the negative side thereof is connected to the wiring hd. The DC voltage detector 17 supplies the detected value to the converter controller 18. The detection value of the DC voltage detector 17 is used to determine whether the voltage value applied to the load H reaches a predetermined target value or not.

The controller 5 including the converter controller 18 is, for example, a microcomputer (not shown). The microcomputer reads out a program stored in ROM (Read Only Memory) and load the program to be stored on RAM (Random Access Memory), and a CPU (Central Processing Unit) performs various processes. The converter controller 18 controls ON/OFF of the MOSFETs Q1, Q2 on the basis of the information inputted from the current detector 11 or the shunt resister R1, the gain controller 12, the zero-cross determining section 14, the boosting ratio controller 16, and the DC voltage detector 17. The process executed by the converter controller 18 will be described later.

The load controllers 19a, 19b are controllers for respectively controlling the inverters 3a, 3b (see FIG. 1) included in the load H. The load controller 19a and the inverter 3a are described with reference to FIGS. 15 to 19.

Next, operation modes of the converter 2 according to the present invention will be described below.

The operation modes of the converter 2 are roughly classified into four modes, i.e., a diode rectification mode, a synchronous rectification mode, a partial switching mode, and a high speed switching mode. The partial switching mode and the high speed switching mode are modes for active operation (power-factor improvement operation) in which boosting the DC voltage Vd and the power-factor improvement operation are carried by allowing power-factor improved currents to flow in the bridge rectifying circuit 10. For example, when the loads such as the inverters 3a, 3b and the motors 4a, 4b are large, it is necessary to boost the DC voltage Vd. Further, as increase in a size of the load, the current flowing in the converter 2 increases, which also increases harmonic component currents. Accordingly, when the load is high, it is necessary to improve the power factor for the power source by performing the partial switching mode or the high speed switching mode for boosting to reduce the harmonic component currents.

Diode Rectification Mode

The diode rectification mode is a mode for full wave rectification using the diodes D1, D2 and the parasitic diodes D3, D4. In this mode, the MOSFET Q1 and the MOSFET Q2 are in OFF states.

Figure 3:
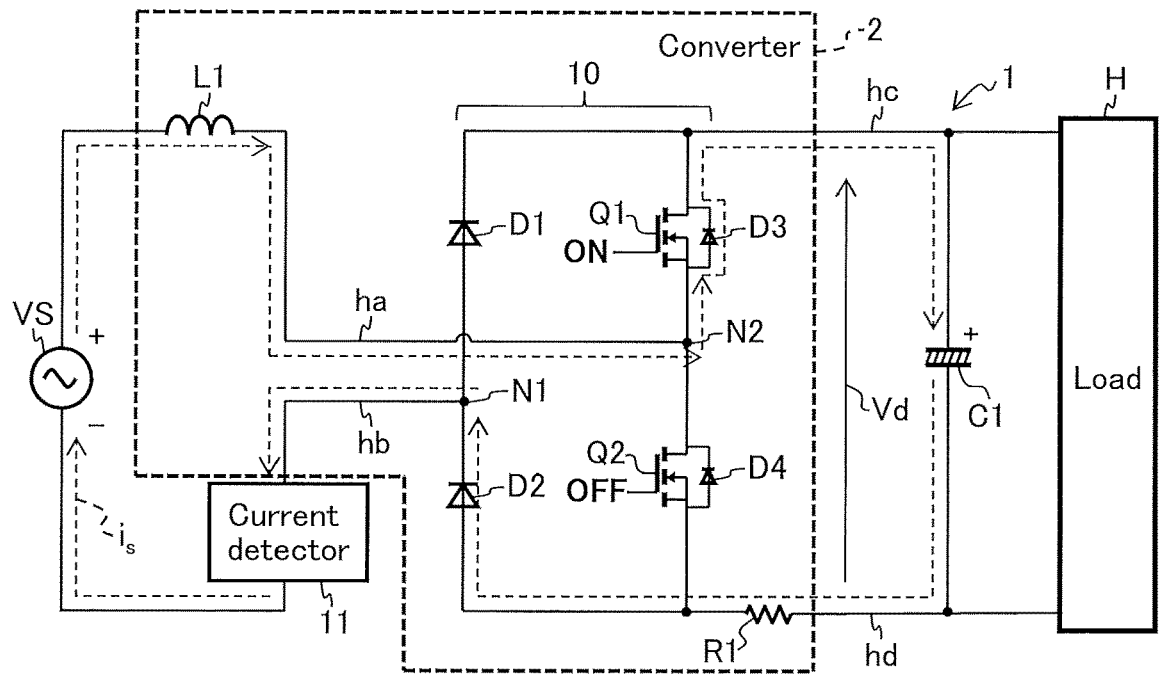
FIG. 3 is a drawing showing paths of currents flowing through the circuit when a diode rectification is performed in a case where the AC power source voltage has a positive polarity.

FIG. 3 is a drawing showing paths of currents flowing through the circuit when the diode rectifying is performed in a case where the AC power source voltage has a positive polarity.

In FIG. 3, in a half cycle period in which the AC power source voltage Vs is positive, a current flows in a direction indicated by broken line with an arrow. More specifically, the current flows from the AC power source VS, via the reactor L1, the parasitic diode D3, the smoothing capacitor C1, the shunt resister R1, and the diode D2 to the AC power source VS in this order.

Figure 4:
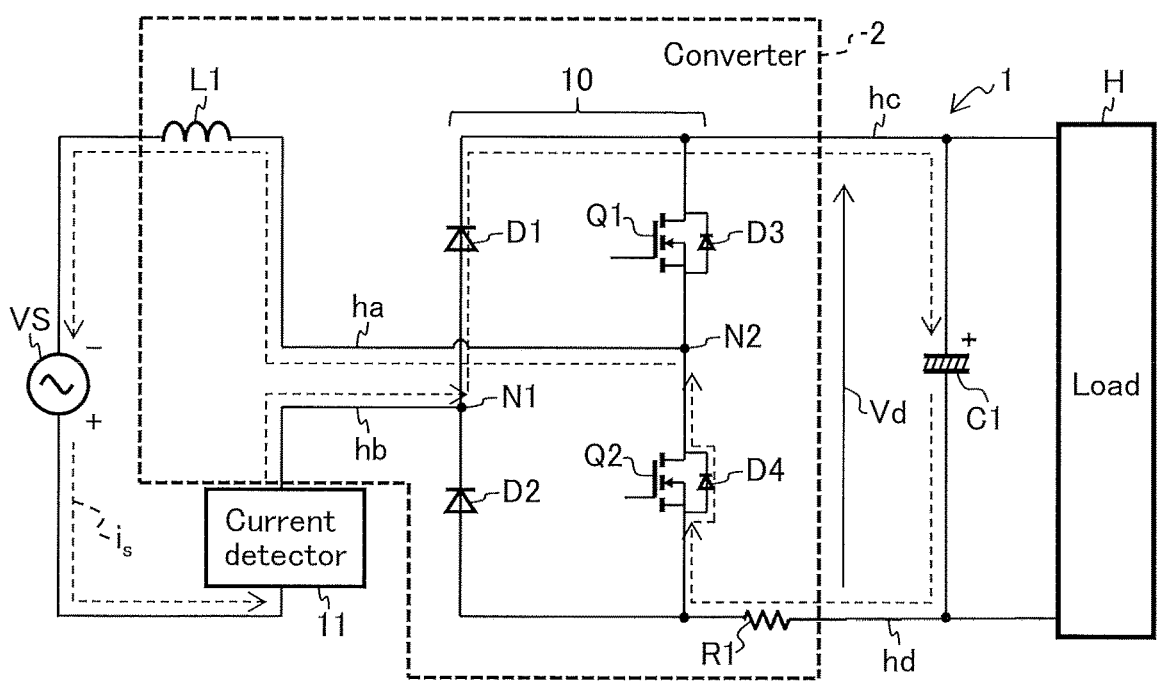
FIG. 4 is a drawing showing paths of currents flowing through the circuit when a diode rectification is performed in a case where the AC power source voltage has a negative polarity.

FIG. 4 is a drawing showing paths of currents flowing through the circuit when a diode rectification is performed in a case where the AC power source voltage has a negative polarity.

In FIG. 4, the current flows in the direction indicated by the broken line with an arrow in a half cycle period in which the AC power source voltage Vs is negative. More specifically, the current flows from the AC power source VS, via the diode D1, the smoothing capacitor C1, the shunt resister R1, the parasitic diode D4, and the reactor L1, to the AC power source VS in this order.

Synchronous Rectification Mode

The controller 5 performs the synchronous rectification by switching control of the MOSFETs Q1, Q2 in accordance with the polarity of the AC power source voltage Vs to perform a higher efficiency operation than the diode rectification. A conversion efficiency of the converter 2 becomes the highest as compared with other modes because the number of times of switching is low in the rectifying operation. In the rectifying operation, a calculation load on the microcomputer for the control of the converter 2 is lowest as compared with other modes.

Figure 5:
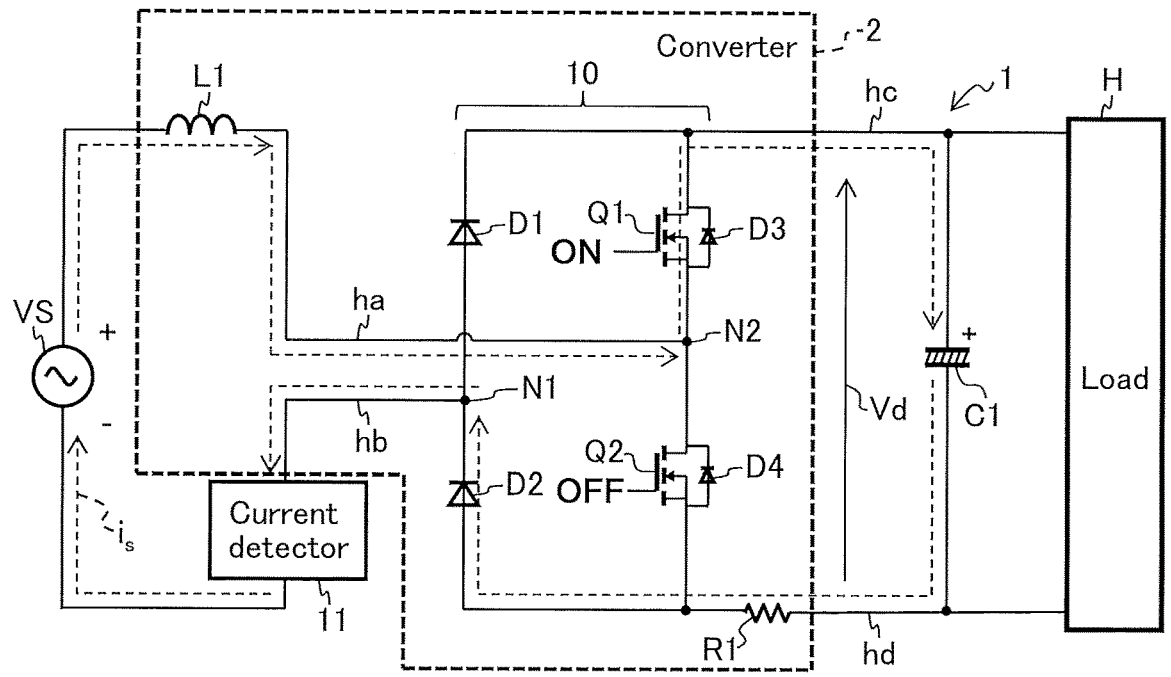
FIG. 5 is a drawing showing paths of currents flowing through the circuit when a synchronous rectification is performed in a case where the AC power source voltage has a positive polarity.

FIG. 5 is a drawing showing paths of currents flowing through the circuit when a synchronous rectification is performed in a case where the AC power source voltage Vs has a positive polarity.

In FIG. 5, in a half period in which the AC power source voltage Vs is positive, the current flows in the direction indicated with the broken line with an arrow. More specifically, the current flows from the AC power source VS, via the reactor L1, the MOSFET Q1, the smoothing capacitor C1, the shunt resister R1, and the diode D2, to the AC power source VS in this order. In this state, the MOSFET Q2 is always tuned off and the MOSFET Q1 is always turned on. If it is assumed that the MOSFET Q1 is not turned on, as described diode rectification operation, the current flows through the parasitic diode D3 of the MOSFET Q1. However, because a forward voltage drop of the parasitic diode is generally large, a large conduction loss is generated. Accordingly, it is possible to reduce the conduction loss by allowing the current to flow through an ON-resistance part of the MOSFET Q1. This is a principle of so-called synchronous rectification control. Here, timing of start of ON operation of the MOSFET Q1 is timing of zero cross when the polarity of the AC power source voltage Vs changes to positive from negative. Timing of turning off the MOSFET Q1 is timing when the polarity of the AC power source voltage Vs changes to negative from positive.

Figure 6:
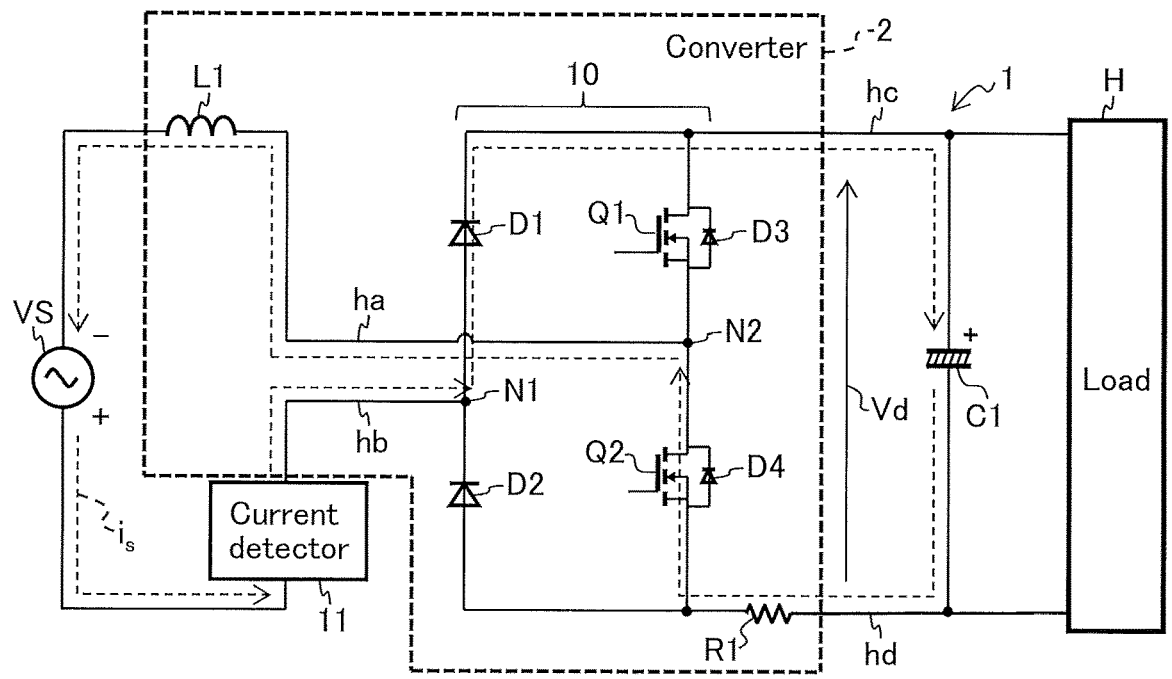
FIG. 6 is a drawing showing paths of currents flowing through the circuit when the synchronous rectification is performed in a case where the AC power source voltage has the negative polarity.

FIG. 6 is a drawing showing paths of currents flowing through the circuit when the synchronous rectification is performed in a case where the AC power source voltage Vs has the negative polarity.

In FIG. 6, in a half cycle period in which the AC power source voltage Vs is positive, a current flows in a direction indicated by broken line with an arrow. More specifically, the current flows from the AC power source VS, via the diode D1, the smoothing capacitor C1, the shunt resister R1, the MOSFET Q2, the reactor L1, and the AC power source VS in this order. In this operation, the MOSFET Q1 is always turned off and the MOSFET Q2 is always turned on. Further, timing of start of ON operation of the MOSFET Q2 is timing of the zero cross when the polarity of the AC power source voltage Vs changes from positive to negative. Timing of turning on of the MOSFET Q1 is timing when the polarity of the AC power source voltage Vs changes to negative from positive. Timing of turning off the MOSFET Q1 is timing when the polarity of the AC power source voltage Vs changes to negative from positive.

As described above, the converter 2 is operated, which provides a high efficiency.

Figure 7:
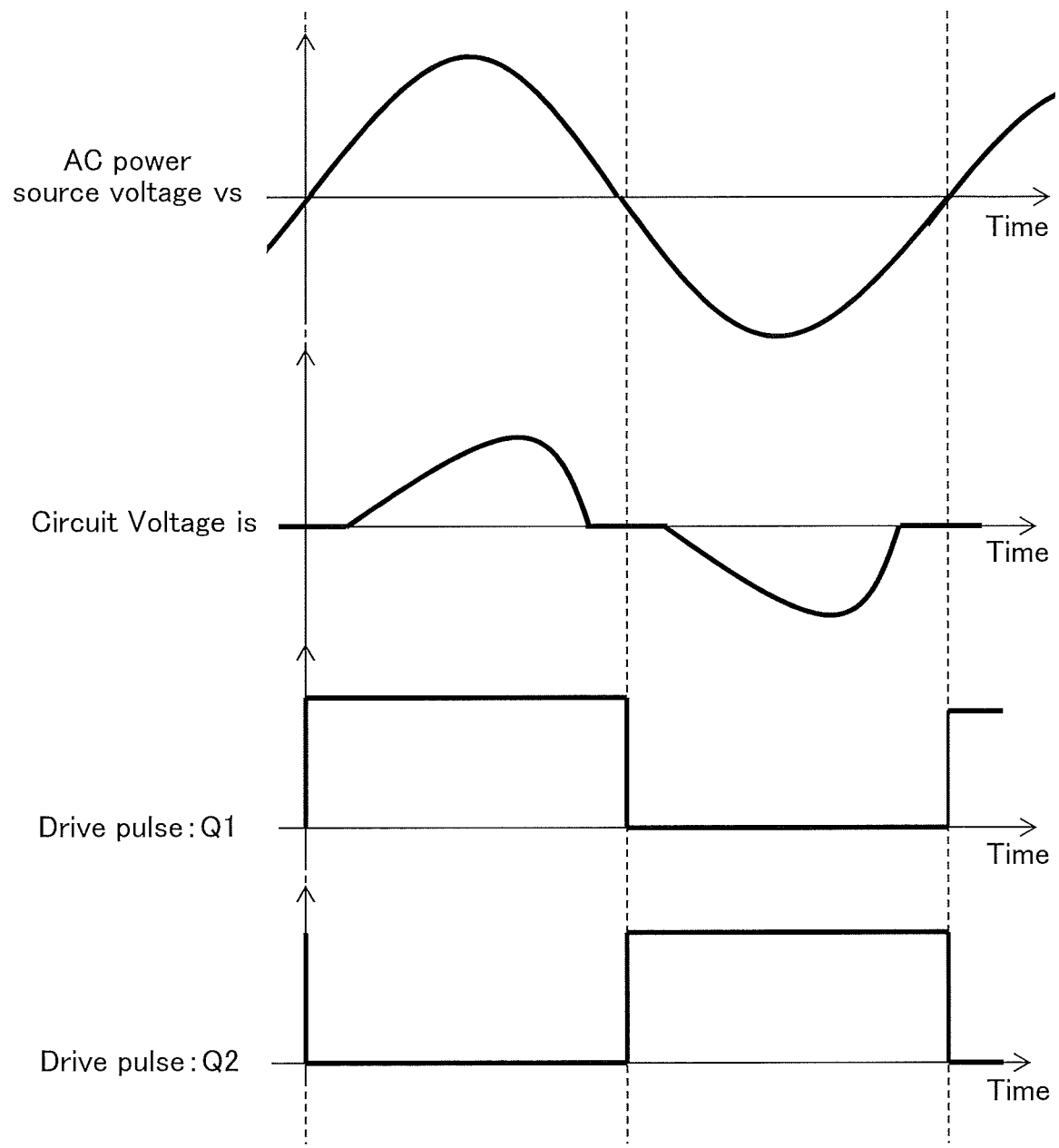
FIG. 7 shows waveforms of a power supply voltage, a circuit current, and driving pulses in the synchronous rectification.

FIG. 7 shows waveforms showing a relation among an AC voltage and AC current flowing through a motor, and pulse signals.

A first graph in FIG. 7 shows a waveform of an instantaneous magnitude vs of the AC power source voltage Vs and a second graph indicates a waveform of the circuit current $i_s$. A third graph in FIG. 7 shows a waveform of drive pulses for the MOSFET Q1 and a fourth graph of FIG. 7 shows a waveform of drive pulses for the MOSFET Q2.

The instantaneous magnitude vs of the AC power source voltage Vs has a substantially sine waveform as shown in the first graph in FIG. 7.

The drive pulses for the MOSFET Q1 are, as shown in a third graph in FIG. 7, have a H level when the polarity of the AC power source voltage Vs is positive and a L level when the polarity of the AC power source voltage Vs is negative.

The drive pulses of the MOSFET Q2 are the inverse of the drivel pulses for the MOSFET Q1 and have the L level when the polarity of the AC power source voltage Vs is positive and has the H level when the polarity of the AC power source voltage Vs is negative.

As shown in the second graph in FIG. 7, the circuit current flows when the AC power source voltage Vs reaches a predetermined amplitude, i.e., when the AC power source voltage Vs is greater than the DC voltage Vd.

High Speed Switching Operation

Next, the high speed switching operation for boosting the DC voltage Vd and improving the power factor is described below. In this operation, the power inputted from the AC power source VS is greater than that in the other modes. On the other hand, because the number of times of switching operation is large in the high speed switching operation and the number of times of shorting operation is large, the high speed switching operation has a boosting power of boosting the DC voltage of the converter 2 and a harmonic component suppression efficient which are higher than those of the other modes.

In this operation mode, boosting the DC voltage Vd and improvement in the power factor are performed by shorting the circuit through the reactor L1 by switching control for the MOSFETs Q1 and Q2 at a certain switching frequency (hereinafter referred to as power factor improvement operation) to allow short circuit current to flow in the circuit (hereinafter referred to as power factor improvement current). First, an operation when the power factor improvement current is allowed to flow is described below.

When the synchronous rectification is performed in a cycle where the AC power source voltage Vs is positive, the current flows as shown in FIG. 5, and the operations of the MOSFET Q1 and the MOSFET Q2 are as described above. In this operation, as shown in the second graph in FIG. 7, the circuit current $i_s$ is distorted from the power source voltage. This is caused by the fact that the current flows at timing only when the DC voltage Vd is smaller than the AC power source voltage Vs and by the characteristic of the power converter 1.

Then, the power factor improvement is performed by approaching the circuit current $i_s$ to a sine wave to reduce harmonic component currents.

Figure 8:
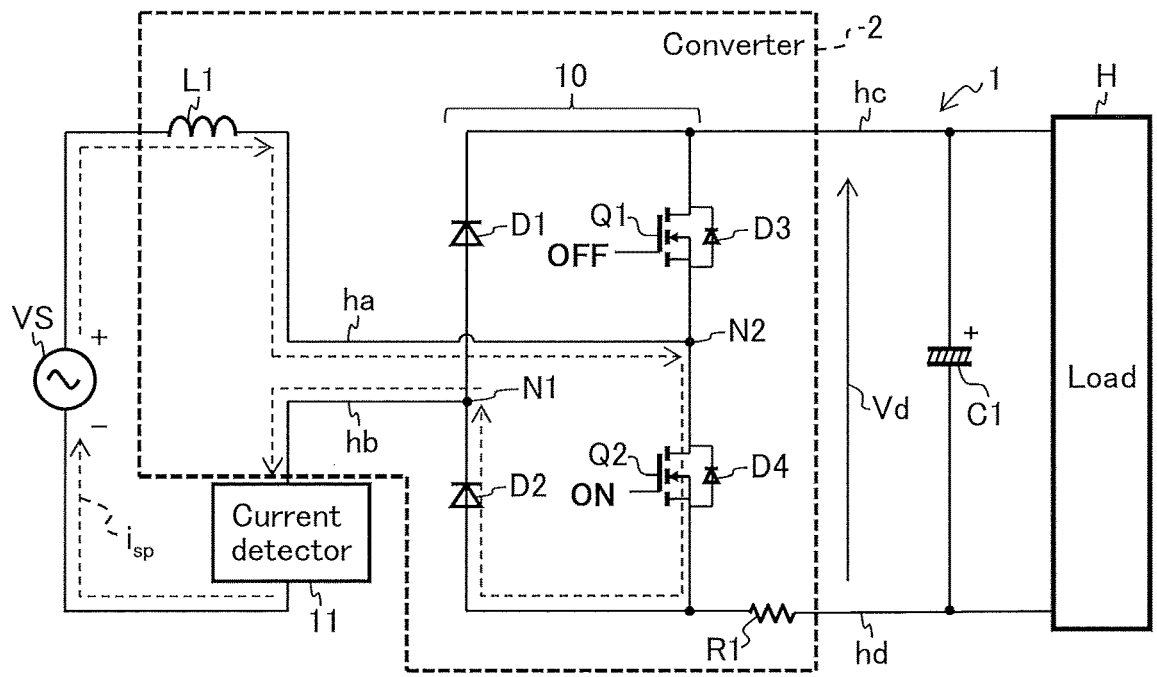
FIG. 8 is a drawing showing paths of currents flowing through the circuit when a synchronous rectification is performed in a case where the AC power source voltage has a positive polarity.

FIG. 8 is a drawing showing paths of currents flowing through the circuit when the synchronous rectification is performed in a case where the AC power source voltage Vs has a positive polarity.

A short circuit current $i_{sp}$ flows on a path from the AC power source VS, via the reactor L1, the MOSFET Q2, and the diode D2, to the AC power source VS in this order. In this operation, energy is stored in the reactor L1 represented in Eq. (1). The energy is discharged to the smoothing capacitor C1, which boosts the DC voltage Vd.

$$W = \frac{1}{2} \cdot L1 \cdot I_{sp}^2 \qquad \text{Eq. (1)}$$

Currents flowing through the circuit when the synchronous rectification performed in a case where the AC power source voltage has the negative polarity is shown in FIG. 6, and the operations of the MOSFET Q1 and the MOSFET Q2 are described above.

Figure 9:
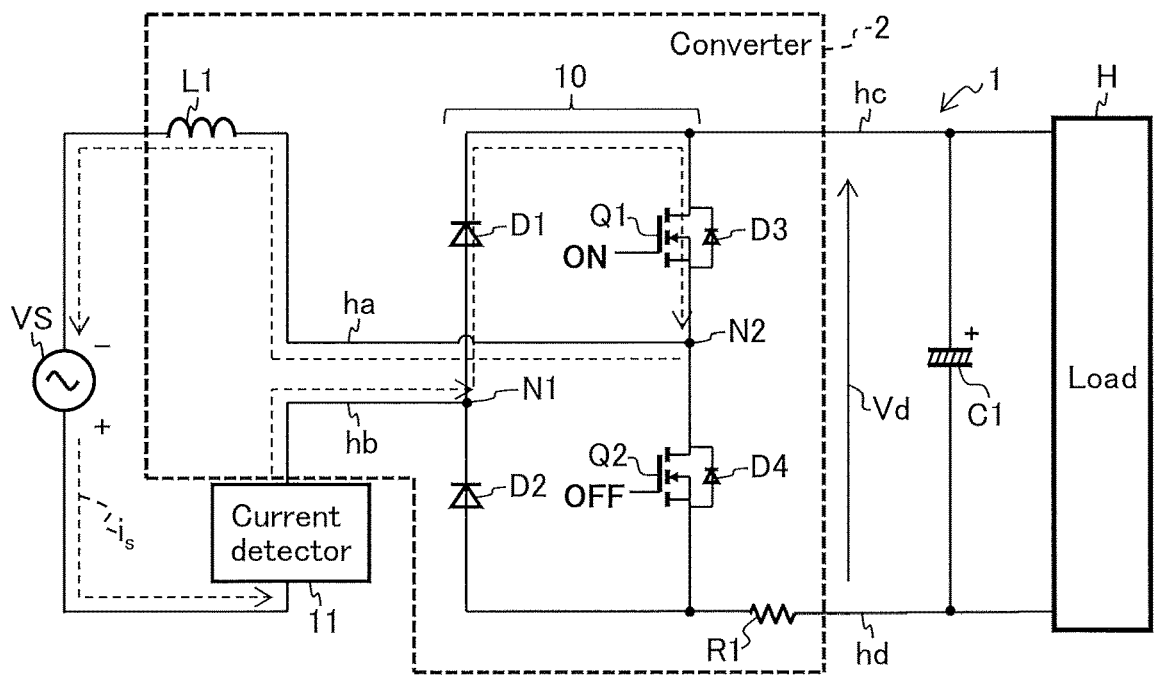
FIG. 9 is a drawing showing paths of currents flowing through the circuit when a power-factor improvement is performed in a case where the AC power source voltage has a negative polarity.

FIG. 9 is a drawing showing paths of currents flowing through the circuit when a power factor improvement is performed in a case where the AC power source voltage has a negative polarity.

The current in the current path flows from the AC power source VS, via the diode D1, the MOSFET Q1, and the reactor L1, to the AC power source VS in this order. In this operation as described above, energy is stored in the reactor L1, and the energy boosts the DC voltage Vd.

Figure 10:
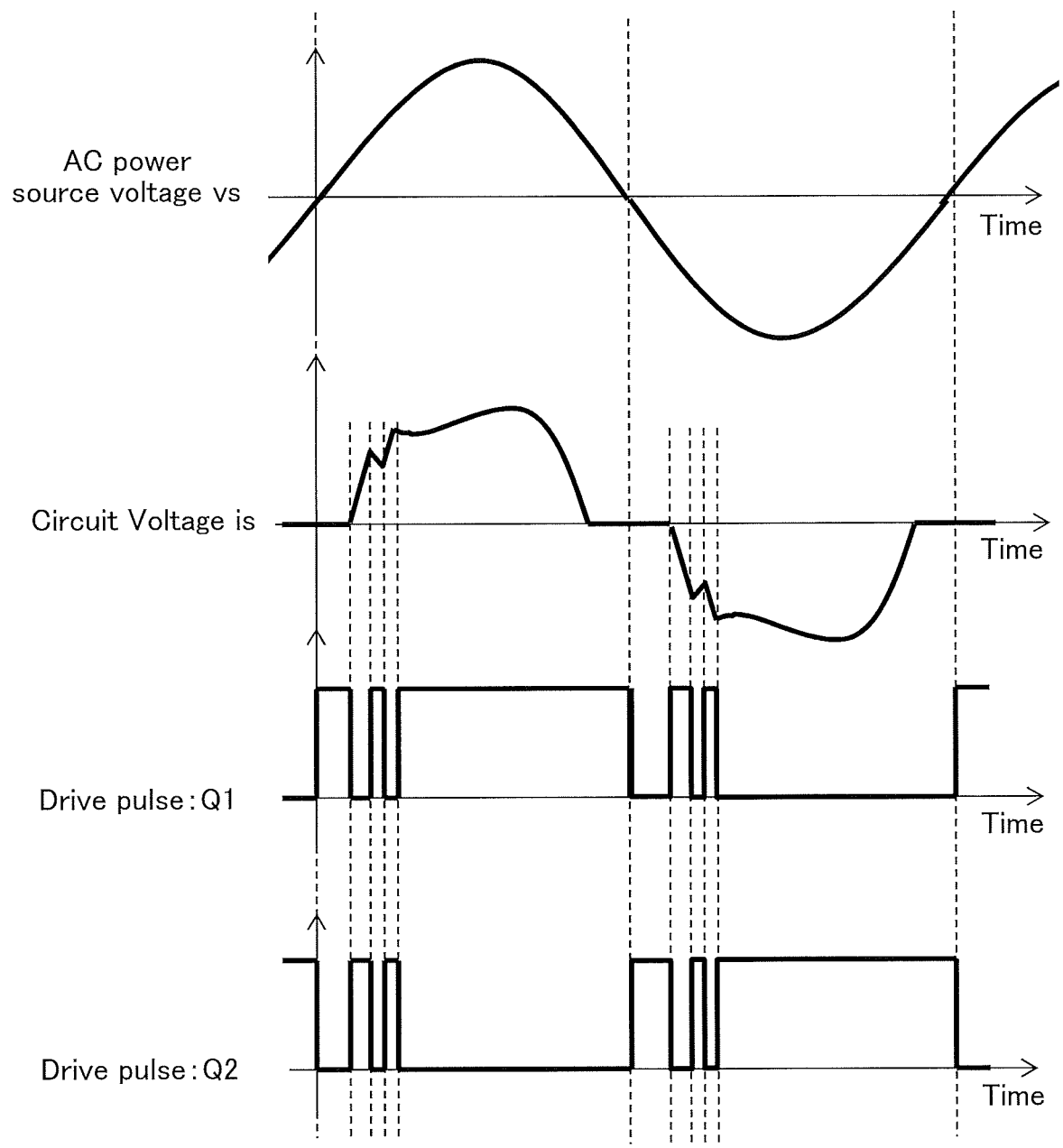
FIG. 10 shows waveforms of a power supply voltage, a circuit current, and driving pulses for a MOSFET when a partial switching (two shuts) is performed.

FIG. 10 shows waveforms of the power supply voltage, the circuit current, and the driving pulses for MOSFETs when the partial switching (two shuts) is performed.

A first graph in FIG. 10 shows a waveform of the moment value vs of the AC power source voltage Vs and a second graph shows a waveform of the circuit current $i_s$. A third graph in FIG. 10 shows a waveform of the driving pulses for the MOSFET Q1, and a fourth graph shows driving pulses for the MOSFET Q2.

As shown in the first graph in FIG. 10, the instantaneous magnitude vs of the AC power source voltage Vs has a waveform having a substantially sine waveform shape.

As shown in the third graph in FIG. 10, the driving pulses for the MOSFET Q1 becomes H level when the polarity of the AC power source voltage Vs is positive, and two L level pulses are generated at a predetermined timing. When the polarity of the AC power source voltage Vs is negative, the drive pulse becomes L level and then two H level pulses are generated at a predetermined timing.

As shown in the third graph in FIG. 10, the driving pulses for the MOSFET Q2 are the inverse of the driving pulses for the MOSFET Q1. This is because the power-factor improvement operation and the synchronous rectification operation are combined. For example, when the AC power source voltage Vs has a positive polarity, the MOSFET Q2 is turned on to perform the power-factor improvement operation. After that, a period where the MOSFET Q2 is turned on after turning off of the MOSFET Q1 is for the synchronous rectification operation. As described above, the high efficiency operation can be done with the power-factor improvement by combining the power-factor improvement operation and the synchronous operation.

As shown in the second graph in FIG. 10, the circuit current rises when the AC power source voltage Vs has the positive polarity and the driving pulse for the MOSFET Q2 becomes H level and rises when the AC power source voltage Vs has the negative polarity and the driving pulse for the MOSFET Q1 becomes H level. This improves the power factor.

For example, when the AC power source voltage Vs is positive, the current path in the power-factor improvement operation is as shown in FIG. 8. The current path when the mode is changed into the synchronous rectification operation as a result of turned off of the MOSFET Q2 and turned-on of the MOSFET Q1.

Further, it is also possible to combine the power-factor improvement operation and the diode rectification operation. More specifically, when the polarity of the AC power source voltage Vs is positive, the current path in the power-factor improvement operation is as shown in FIG. 8. After the MOSFET Q2 is turned off, the parasitic diode D3 turns on, so that the mode changes into the diode rectification operation. The current path in this state is as shown in FIG. 3.

Figure 11:
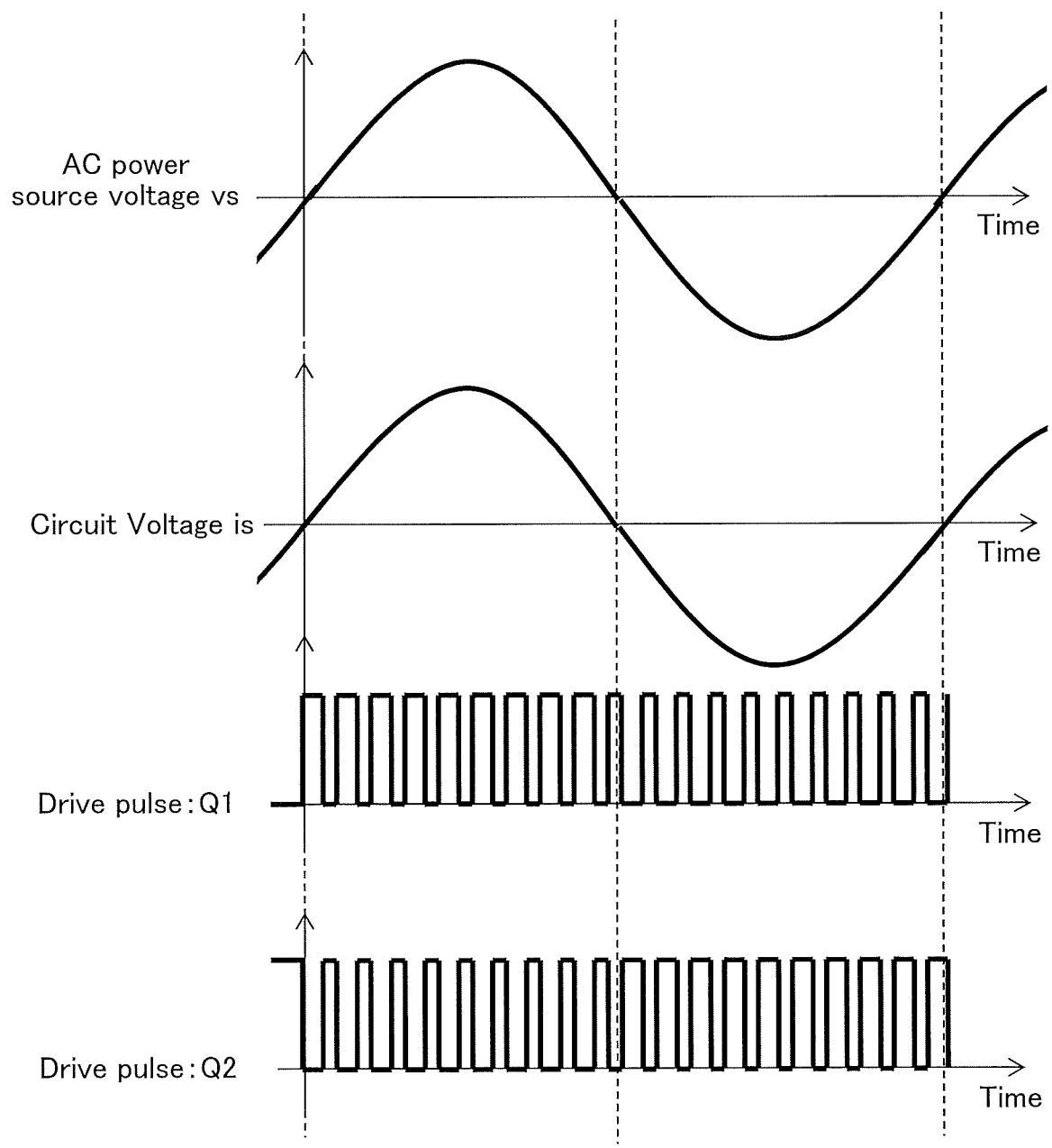
FIG. 11 shows waveforms of a power supply voltage, a circuit current, and driving pulses for the MOSFET when a high-speed switching is performed.

FIG. 11 shows waveforms of a power supply voltage, a circuit current, and driving pulses for the MOSFET when a high-speed switching is performed.

A first graph in FIG. 11 shows a waveform of the instantaneous magnitude vs of the AC power source voltage Vs, and a second graph in FIG. 11 shows a waveform of the circuit current is. A third graph in FIG. 11 shows driving pulse waveforms for the MOSFET Q1 and a fourth graph in FIG. 11 shows driving pulse waveform for the MOSFET Q2.

As shown in the first graph in FIG. 11, the instantaneous magnitude vs of the AC power source voltage Vs have a substantial sine waveform shape.

In the high speed switching operation, for example, when the power source voltage is positive in the polarity, the short circuit current $i_{sp}$ is allowed to flow by turning on the MOSFET Q2 and turning off the MOSFET Q1. Next, the MOSFET Q2 is turned off and the MOSFET Q1 is turned on. As described above, switching is made between turning on and off of a MOSFET Q1 and MOSFET Q2 in accordance with existence of the power-factor improvement operation. This is made for the synchronous rectification is performed. For example, when interruption, etc. is used in the microcomputer, the calculation load on the microcomputer for the control for the converter 2 becomes larger than that in the other modes.

However, to perform the high speed switching operation simply, it is enough to perform the switching operation with the MOSFETs Q1 and Q2 complementally at a constant frequency. In the high speed switching operation described above, the calculation load on the microcomputer for the controlling the converter becomes smaller than those in the other modes because the high speed switching operation is performed by only outputting the pulse signals at a constant frequency simply.

As described above, an embodiment in which the high speed switching and the synchronous rectification are performed in combination. Further, it is also possible to perform the high speed switching and the diode rectification in combination. In other words, when the AC power source voltage Vs is positive in the polarity, the high speed switching is performed at only the MOSFET Q2 in a state in which the MOSFET Q1 is always in OFF state. This control also provides the power-factor improvement effect.

Partial Switching Operation

As described, the circuit current $i_s$ can be shaped in a sine wave by performing the high speed switching operation to have a high power factor. However, as the switching frequency increases, the switching loss increases.

Particularly, it becomes difficult to satisfy a limit value of harmonic component currents because as a circuit input increases, harmonic component currents largely increases, so that it is required to secure a high power factor as increase in the input current. Contrary to this, when the input is small, the harmonic component current is small. Accordingly, there may be a case that it is not necessary to secure a power factor more than necessary. In other words, it is sufficient to reduce the harmonic component current by keeping an appropriate power factor while an efficiency is considered in accordance with the load condition.

Then, to improve the power factor with increase in the switching loss being suppressed, it is sufficient to perform the partial switching operation. The power inputted from the AC power source VS during the partial switching operation is greater than power in the rectification operation and smaller than the power during the high speed switching operation. During the partial switching operation, the controller 5 uses a DTC (Data Transfer Control) function provided to the microcomputer. The DTC function is a hardware function of outputting pulses having a predetermined pattern at a preset timing. According to the DTC function, it is possible to output pulses having a predetermined pattern at accurate timing without influence of delay in software calculation in the microcomputer. The microcomputer in the embodiment includes two channels of the DTC functions.

The partial switching operation is not performing the power-factor improvement operation at a predetermined frequency like the high speed switching, but an operation mode, in which the DC voltage Vd is boosted and the power factor is improved by performing a plurality of times of the power-factor improvement operation at a predetermined phase in a half cycle of the AC power source voltage Vs. This can reduce the switching loss by decrease in the number of times of switching of the MOSFET Q1 and the MOSFET Q2 more than the case of the high speed switching operation. Hereinafter, referring to FIG. 12, the partial switching operation is described below.

Figure 12:
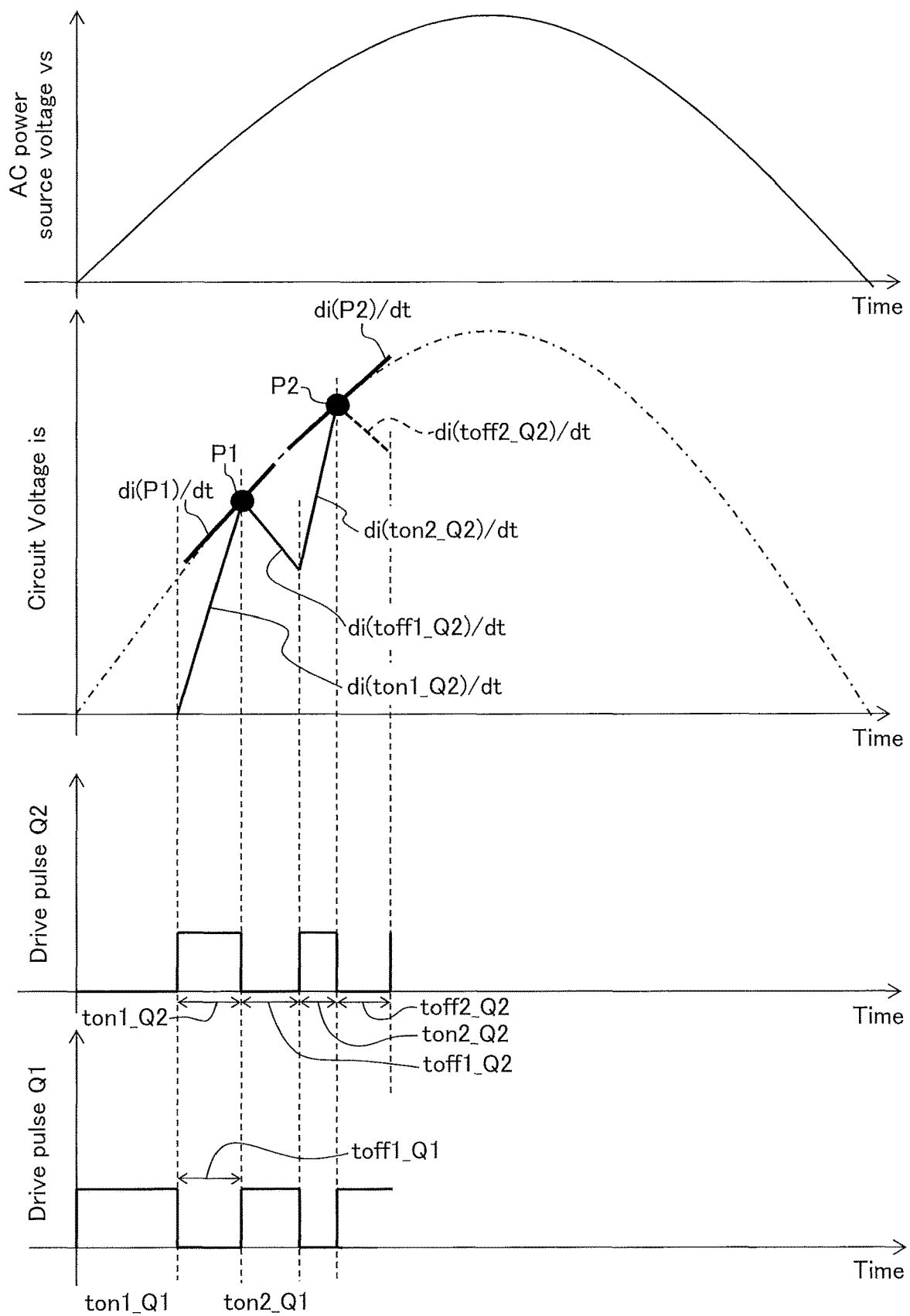
FIG. 12 is a drawing explaining outline of the partial switching.

FIG. 12 is a drawing explaining outline of the partial switching.

A first graph in FIG. 12 shows the instantaneous magnitude vs of the AC power source voltage Vs, and a second graph shows the circuit current $i_s$.

A third graph in FIG. 12 shows driving pulses for the MOSFET Q2, and a fourth graph shows the driving pluses for the MOSFET Q1.

As shown in the first graph in FIG. 12, the instantaneous magnitude vs of the AC power source voltage Vs has a substantially sine wave shape.

A dashed line in the second graph in FIG. 12 shows an ideal circuit current $i_s$ in a substantially sine wave shape. The power factor is most improved in this state.

Here, for example, suppose a point P1 on the ideal current, and let an inclination at this point be di(P1)/dt. Let an inclination of the current when the MOSFET Q2 is turned on from a state in which the current is zero to time ton1_Q2 be di(ton1_Q2)/dt. Further, let an inclination of the current be di(toff1_Q2)/dt when the current is ON to ton1_Q2 and turned off to toff_Q2. Now controlling is performed so as to equalize an average value of the di(ton1_Q2)/dt and di(toff1_Q2)/dt to the inclination di(P1)/dt at the point P1.

Next, similar to the point P1, let an inclination at a point P2 be di(P2)/dt. Let an inclination of the current when the MOSFET Q2 is turned on to time toff2_Q2 be di (toff2_Q2)/dt. Similar to the point P1, controlling is performed so as to equalize an average value of di (ton2_Q2)/dt and di(toff2_Q2)/dt to the inclination di(P2)/dt at the point P2. Hereinafter, this is repeated. In this operation, the greater number of times of switching of the MOSFET Q2, the more ideal approximation to sine wave is possible.

In addition, switching is made for the MOSFET Q1 and the MOSFET Q2 complementary because the partial switching operation and the synchronous rectification operation are performed in combination.

Occasionally, it is allowed to perform the partial switching operation with the diode rectification operation.

Switching Control Mode

The converter 2 can perform the diode rectification control, the synchronous rectification control, and the partial switching control, and the high speed switching control. For example, depending on the type of the used device, a required performance may be changed in accordance with the load condition at a region in which the high efficiency is prioritized, a region in which the boosting and the power-factor improvement are prioritized, etc. Then, it is possible to perform high efficient control and reduction in the harmonic component current compatibly by switching among the four modes on the basis of predetermined threshold information.

Figure 13:
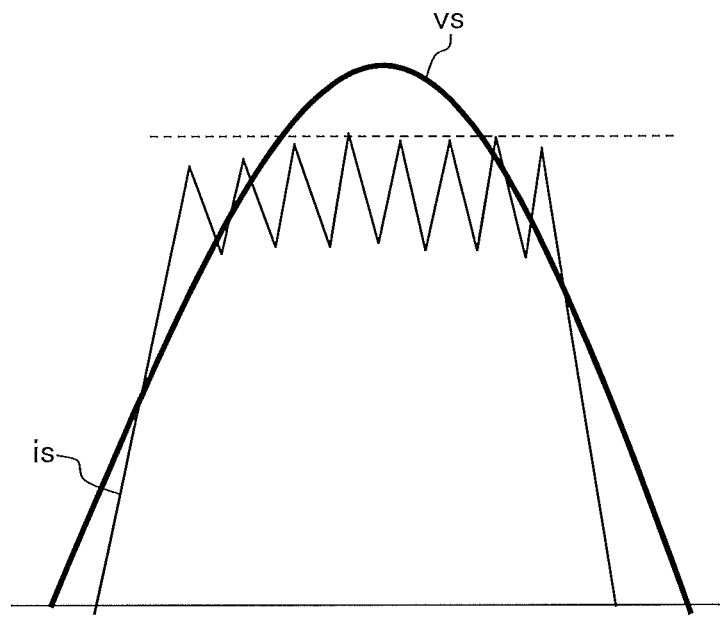
FIG. 13 is a drawing of a current waveform before switching from the partial switching to the high speed switching.

FIG. 13 is a drawing of a current waveform before switching from the partial switching to the high speed switching. FIG. 13 schematically shows the instantaneous magnitude vs of the AC power source voltage Vs and the input current Is.

Figure 14:
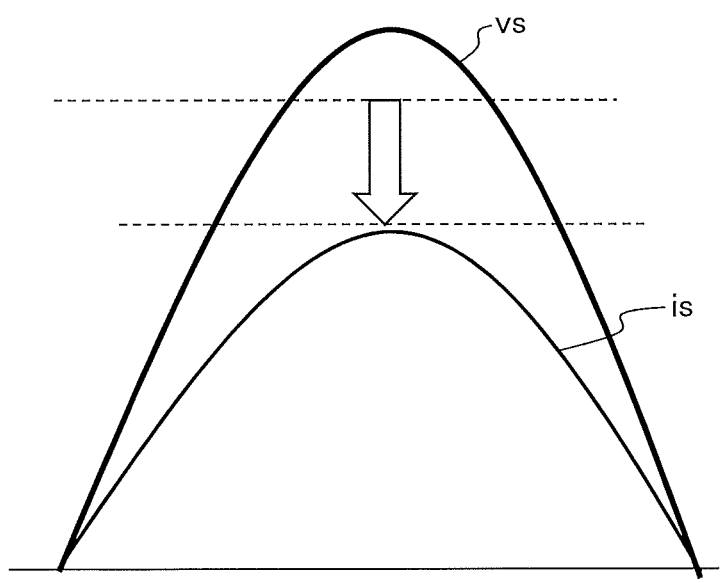
FIG. 14 is a drawing showing a current waveform after the switching from the partial switching to the high speed switching.

FIG. 14 is a drawing showing a current waveform after the switching from the partial switching to the high speed switching. FIG. 14 schematically shows the instantaneous magnitude vs of the AC power source voltage Vs when the control is changed into the high speed switching control. The peak of the circuit current $i_s$ at this instance is smaller than a peak of the current $i_s$ shown in FIG. 13. As described, the control is switched with adjustment of the ON interval can suppress a variation of the DC voltage Vd. This is because the current becomes small because the high speed switching has a better power factor than the partial switching. In other words, when the control is switched to have a current amplitude same as that upon the partial switching, the DC voltage Vd is excessively boosted. This can suppress the variation in the DC voltage Vd.

Similarly, when the control is switched from the high speed switching to the partial switching, switching is made with adjustment of the ON interval to increase the amplitude of the current oppositely to the previous control, which prevents decrease in the DC voltage Vd inversely.

Further, switching between respect controls can be performed stable at timing of zero cross of the power source voltage.

Figure 15:
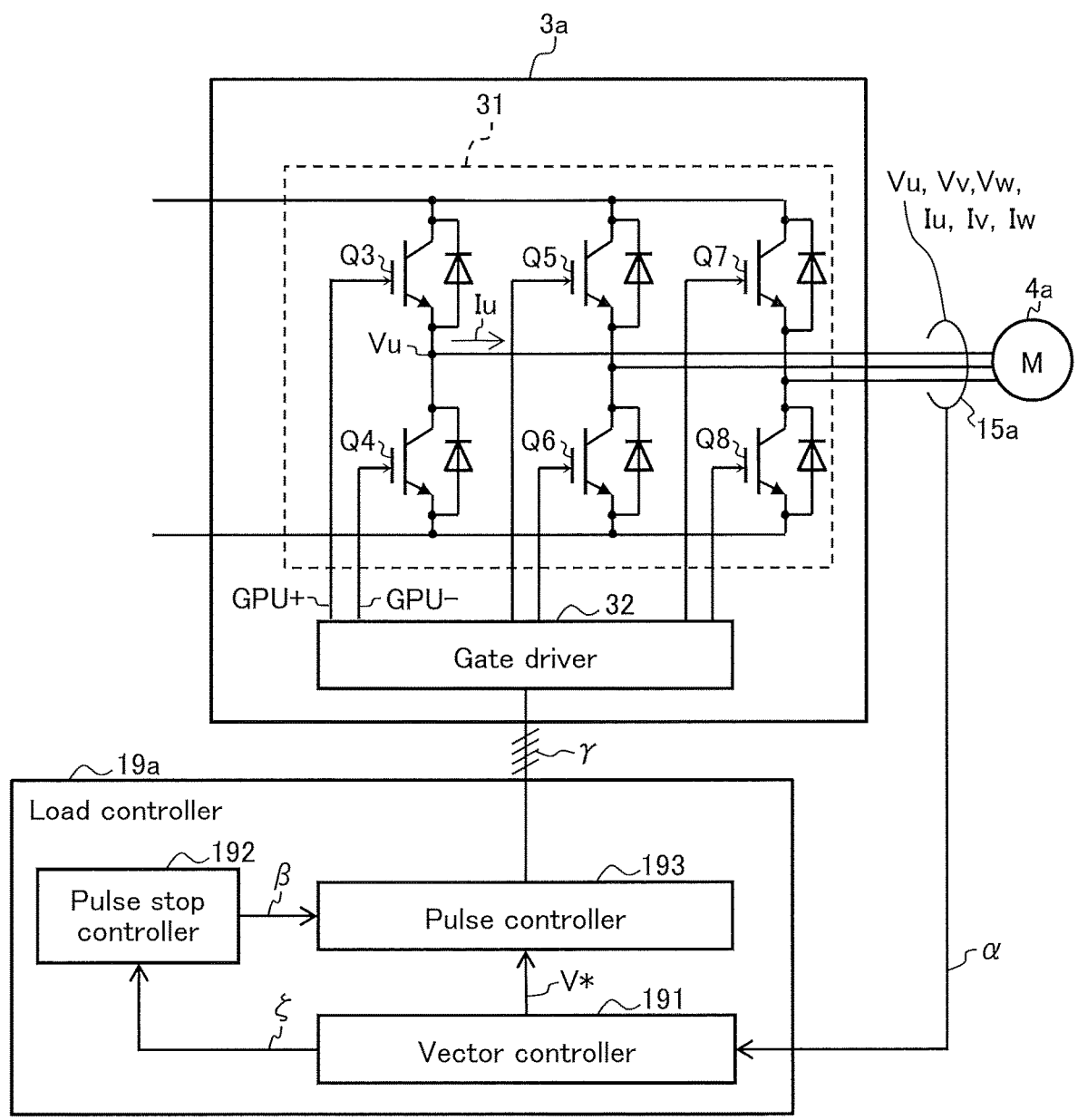
FIG. 15 is a drawing showing a circuit configuration of an inverter.

FIG. 15 is a drawing showing a circuit configuration of the inverter 3a.

FIG. 15 shows a circuit configuration of the inverter 3a included in the power converter 1 having a PWM (Pulse Width Modulation) control method according to the embodiment of the present invention. The power converter 1 drives the motor 4a, which is a permanent magnet synchronous motor, by vector control with the inverter 3a including three-phase inverter for driving by PWM control. In this case, control is performed by providing phase pulse stop intervals (open phase interval) in the pulse signal of the inverter 3a. The inverter 3b is configured similarly to the inverter 3a, and its description is omitted.

Circuit Configuration of Inverter

As shown in FIG. 15, the power converter 1 includes the inverter 3a, the phase current detector 15a, and the load controller 19a. The inverter 3a can perform intermittent energization in which switching a motor current around zero cross of the motor current while the DC power is converted into three-phase AC power. The phase current detector 15a detects a motor current flowing in the motor 4a, which is an AC motor connected to the inverter 3a. The load controller 19a performs the vector control using the pulse signal for PWM control on the basis of the phase current information (current) a detected by the phase current detector 15a. The inverter 3a is configured including a gate driver 32 and a power converting circuit 31.

The gate driver 32 generates gate signals supplied to each of IGBTs (Insulated Gate Bipolar Transistor) in the power converting circuit 31 on the basis of a pulse signal γ supplied from a pulse controller 193.

The power converting circuit 31 is configured including switching elements Q3 to Q8, each including IGBT and a diode are connected in parallel in opposite directions. The power converting circuit 31 is configured including switching legs having a three-phase structure of U-, V-, and W-phases, converts a DC power into an AC power using pulse signals γ outputted by the pulse controller 193.

The U-phase switching leg is configured including switching elements Q3, Q4 which are connected in series between positive and negative terminals thereof. A collector of the switching element Q3 is connected to the positive terminal, and an emitter of the switching element Q3 is connected to a collector of a switching element Q4. An emitter of the switching element Q4 is connected to the negative terminal. A junction node of the emitter of the switching element Q3 and the collector of the switching element Q4 is connected to a U-phase coil of the motor 4a. Let a voltage of the junction node of the emitter of the switching element Q3 and the collector of the switching element Q4 be a voltage Vu, and let a current flowing in the U-phase coil of the motor 4a be U-phase AC current Iu.

A gate of the switching element Q3 is supplied with a pulse signal GPU+ outputted by the gate driver 32. A gate of the switching element Q4 is supplied with a pulse signal GPU- outputted by the gate driver 32.

The U-phase switching leg is configured including switching elements Q5, Q6 which are connected in series between positive and negative terminals thereof. A collector of the switching element Q5 is connected to the positive terminal, and an emitter of the switching element Q5 is connected to a collector of a switching element Q6. An emitter of the switching element Q6 is connected to the negative terminal. A junction node of the emitter of the switching element Q5 and the collector of the switching element Q6 is connected to a V-phase coil of the motor 4a. Gates of the switching elements Q5, Q6 are supplied with pulse signals outputted by the gate driver 32, respectively.

The W-phase switching leg is configured including switching elements Q7, Q8 which are connected in series between positive and negative terminals thereof. A collector of the switching element Q7 is connected to the positive terminal, and an emitter of the switching element Q7 is connected to a collector of a switching element Q8. An emitter of the switching element Q8 is connected to the negative terminal. A junction node of the emitter of the switching element Q7 and the collector of the switching element Q8 is connected to a W-phase coil of the motor 4a. Gates of the switching elements Q7, Q8 are supplied with pulse signals outputted by the gate driver 32, respectively.

The load controller 19a is configured including the pulse controller 193, a vector controller 191, and a pulse stop controller 192. The vector controller 191 performs vector control using the phase current information a detected by the phase current detector 15a to calculate an application voltage command V*. The pulse controller 193 supplies the pulse signal γ controlled on the basis of the application voltage command (command voltage) V* to the gate driver 32 to cause the gate driver 32 to perform the PWM control. The pulse stop controller 192 generates a phase pulse stop control signal (pulse stop control signal) β on the basis of phase information (current phase) ζ of the current calculated by the vector control. The phase pulse stop control signal (pulse stop control signal) β is for stopping the pulse signal γ in the phase pulse stop interval (open phase interval) δ around current zero-cross and supplied to the pulse controller 193. The controller 5 uses the DTC function of the microcomputer to output the phase pulse stop control signal (pulse stop control signal) β at predetermined timing.

Here, the vector controller 191 is provided using a general vector control and the control method is not specified. In the general vector control is, for example, an inverter is driven by detecting an inverter output current which is three-phase/two-phase-converted (dq-conversion; direct-quadrature conversion) and fed back to the control system and two-phase-three-phase-converted again as disclosed in a non-patent Document 1, "A simplified vector control is proposed as a driving method of permanent magnet synchronous motor (PMSM) for electrical household appliances", by Sakamoto, etc. paper of the Institute of Electrical Engineers of Japan, D, Vol. 124, No. 11(2004), pp. 1133-1140 and a non-patent document 2, "Examination of New Vector Control System of Permanent Magnet Synchronous Motor for High-Speed Drives" by TOBARI, etc. paper of the Institute of Electrical Engineers of Japan, D, Vol. 129 No. 1,(2009).1 pp. 36-45. Accordingly the control method is not specified. Therefore, the operation of the vector controller 191 is known and a duplicated description is omitted.

Waveform in General Operation

Figure 16:
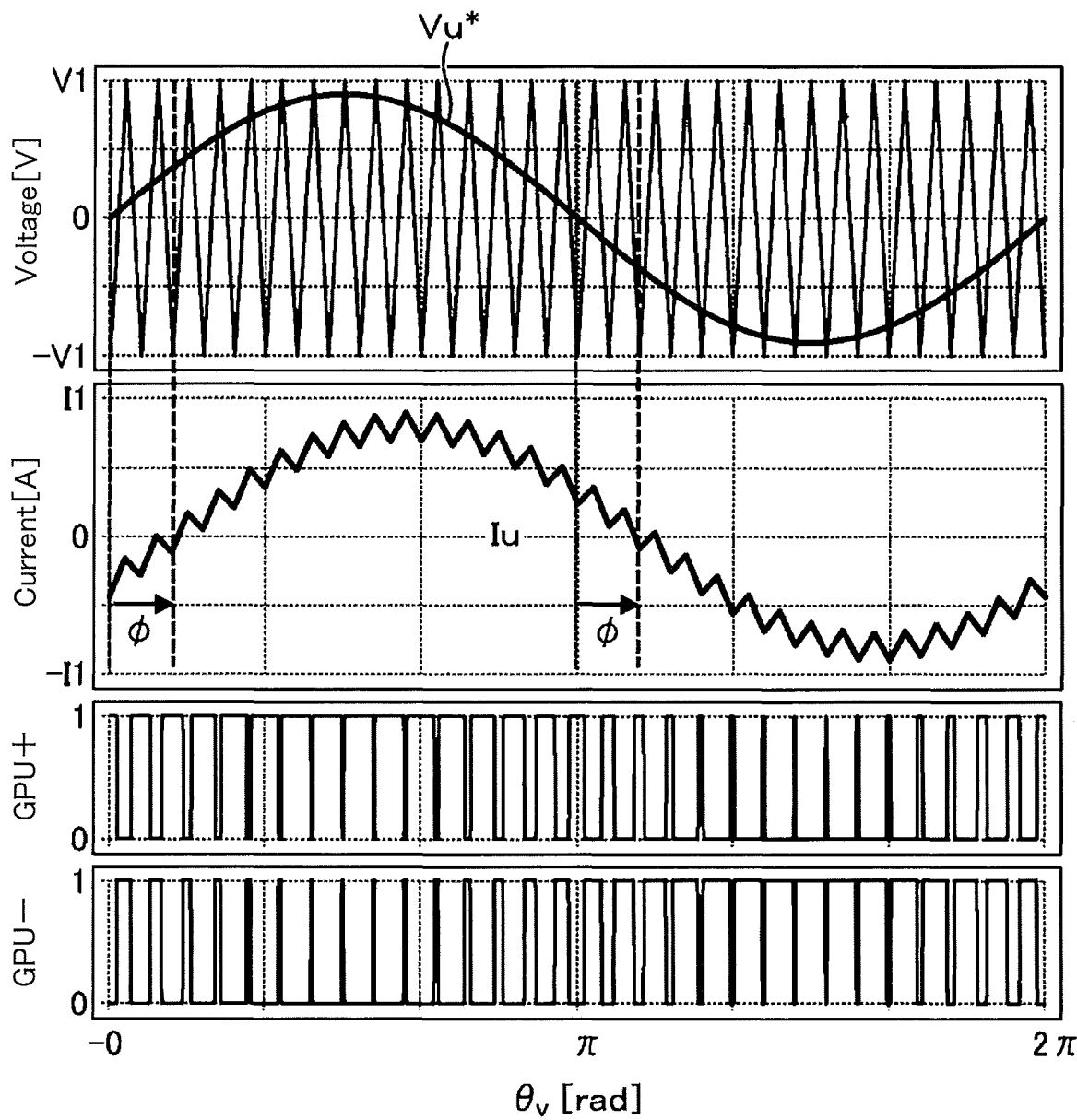
FIG. 16 shows waveforms showing a relation among an AC voltage and AC current flowing through a motor, and pulse signals while the inverter operates.

To make the PWM control in the intermittent energization operation by the load controller 19a clear, the PWM control in the general operation is described, referring to FIG. 16. FIG. 16 shows waveforms showing a relation among an AC voltage and AC current flowing through a motor, and pulse signals, in which the axes of abscissa represents a voltage phase, the axes of ordinate represent respective level of the voltage, the current, and respective levels of the pulse signals.

In the general operation, the load controller 19a (see FIG. 15) generates a PWM pulse signal by comparing a PWM carrier signal and the application voltage command V* as shown in the first graph in FIG. 16. A command value of the application voltage command V* is obtained by performing a calculation by the vector controller 191 on the basis of the phase current information a detected by the phase current detector 15a. Obtaining the phase current information a by the phase current detector 15a may be done by directly detecting AC output current by a CT (Current Transformer) as disclosed in FIG. 1 in JP2004-48886 A, and a method of reproducing the phase current on the basis of the current information detected by a shunt resistor as disclosed in FIG. 12 in JP2004-48886 A.

Next, a relation among the AC voltage, an AC current, pulse signals supplied to the motor 4a (see FIG. 15) from the inverter 3a (see FIG. 15) is described in detail below referring to FIG. 16. The first graph in FIG. 15 shows the PWM carrier signal and the application voltage command V* and representatively, a U-phase application voltage command Vu* is shown. Here, θv represents a voltage phase with reference to the U phase.

In the PWM control method, the pulse controller 193 generates pulse signals GPU+, GPU- shown in the third graph in FIG. 16 on the basis of the U-phase application voltage command Vu* and a triangle wave carrier signal (PWM carrier signal), and supplies these pulse signals GPU+, GPU- to the DC voltage waveform 32 to drive the carrier wave 31. Further, a pulse signal GPU+ is applied to the gate of the switching element Q3 on an upper side of the U-phase. The pulse signal GPU− is applied to the switching element Q4 disposed on a lower side of the U-phase. In other words, the pulse signals GPU+, GPU− are inverse signals regarding positive and negative (1, 0).

The carrier wave 31 performs the PWM control using the pulse signals GPU+, GPU−, so that a U-phase AC current Iu as shown in the second graph in FIG. 16 flows through the motor 4a. Here, φ represents a phase difference between the voltage and current.

Further, the vector controller 191 controls a voltage amplitude and the phase difference φ by performing the vector control on the basis of the phase current information α including the U-phase AC current Iu.

As shown in FIG. 16, in the PWM control in the general operation, in one cycle of the voltage and current, the switching operation is always done to provide 180-degree energization, so that the number of times of switching is larger than those of the 120-degree energization method and 150-degree energization method. Accordingly, in the 180-degree energization, the switching loss caused by this increases.

Waveforms in Intermittent Energization

Figure 17:
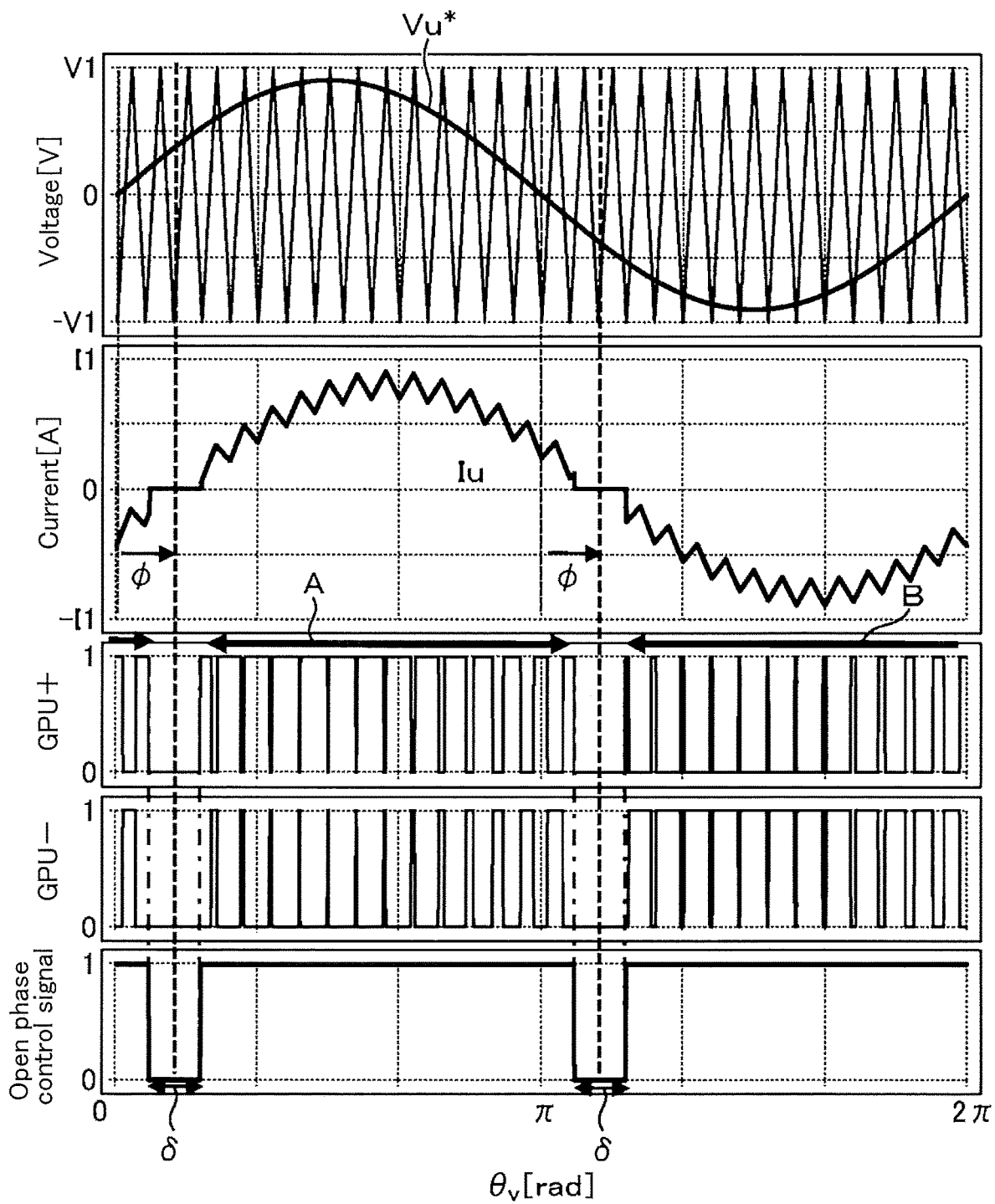
FIG. 17 shows waveforms showing a relation among an AC voltage and AC current flowing through the motor, and phase pulse stop control signals.

FIG. 17 shows waveforms showing a relation among an AC voltage and AC current, flowing through the motor, and phase pulse stop control signals. The axes of abscissas represent a voltage phase. Axes of ordinate represents, voltage, current, and levels of the pulse signal and an open phase control signal (phase pulse stop control signal), respectively. In other words, FIG. 17 shows waveforms of the intermittent energization operation as compared with the waveforms in the general operation shown in FIG. 16.

As shown in the fourth graph in FIG. 17, the pulse stop controller 192 supplies the phase pulse stop control signal (open phase control) β to stop switching the pulse signal GPU+, GPU− in the phase pulse stop intervals (open phase control signal at a phase φ and a phase φ+π, referring to the zero cross point φ of the current phase controlled by the vector control as a reference, as shown in Eq. (2) below. In the pulse stop control signal β has a value of "0", when switching in both the pulse signals GPU+, GPU− are stopped, and a value of "1" when the switching stop is not made, but PWM control switching are made.

$$\beta = \begin{cases} 0 & \left(\text{When } \phi - \frac{\delta}{2} < \theta_v < \phi + \frac{\delta}{2}\right) \\ 0 & \left(\text{When } \phi + \pi - \frac{\delta}{2} < \theta_v < \phi + \pi + \frac{\delta}{2}\right) \\ 1 & \text{(Other cases)} \end{cases} \quad \text{Eq. (2)}$$

As understood from Eq. (2), let φ be a phase difference between the voltage and the current, δ be pulse stop interval (open phase interval), when the voltage phase θv referring to the U phase as a base is φ−δ/2<θv<φ+δ/2, and when the voltage phase θv is φ+π−δ/2<θv<φ+π+δ/2, the switching by the pulse signal GPU+ and GPU− is stopped. In the interval other than this interval, the switching by the pulse signals GPU+ and GPU−.

Accordingly the output state of the pulse controller 193 is such that both the pulse signals GPU+ and GPU− are turned off at the phase pulse stop interval δ. Then, the pulse controller 193 outputs a signal train of pulse signals in which the pulse is not outputted in the phase pulse stopping interval δ as shown in the third graph of the FIG. 17. In other words, phase pulse stopping intervals (open phase intervals) δ are set twice in one-cycle of the voltage and the current. Further, in the configuration according to the present embodiment, it is possible to provide a similar phase pulse stopping interval δ in a two-phase modulation type PWM control method, or a third-harmonic component addition type PWM control method in addition to the sine wave PWM control method.

As described above, the pulse signals GPU+, GPU− in which the intervals of stopping the switching operation are provided by the pulse stop controller 192 have waveforms in which the switching is not made with reference to the applied voltage phase and an induced voltage phase of the inverter circuit 4. More specifically, the switching stopping interval and the switching operation interval are provided with reference to the zero-cross point of the current phase.

In other words, in the general operation, since the pulse signals are pulse signals referring to the voltage phase of the induced voltage, the pulse signal train having ON/OFF duties before and after the zero cross point are symmetrical as shown in the third graph of FIG. 16. On the other hand, in the intermittent energization operation, because the phase pulse stopping interval δ is provided with reference to the current phase (i.e., it is not the pulse signal refereeing to the voltage phase), as shown in the third graph of FIG. 17, the ON/OFF duty are not symmetrical before and after the voltage zero cross point. In the embodiment, the ON/OFF duty of the pulse signal train before and after the current zero cross point are asymmetrical.

As described above, in the intermittent energization operation, since the phase pulse stop interval δ is provided in the interval including zero-cross of the current, pulse trains A and B before and after the phase pulse stop interval δ as a center have asymmetric shapes. Accordingly, when the phase pulse stop interval δ is provided in the interval including zero-cross points of the current, it is easy to determine whether the intermittent energization operation according to the present embodiment is applied or not by observing to determine whether the pulse signals before and after the phase pulse stop interval δ are asymmetry or not.

Waveform Upon Driving Actual Devices

Figure 18:
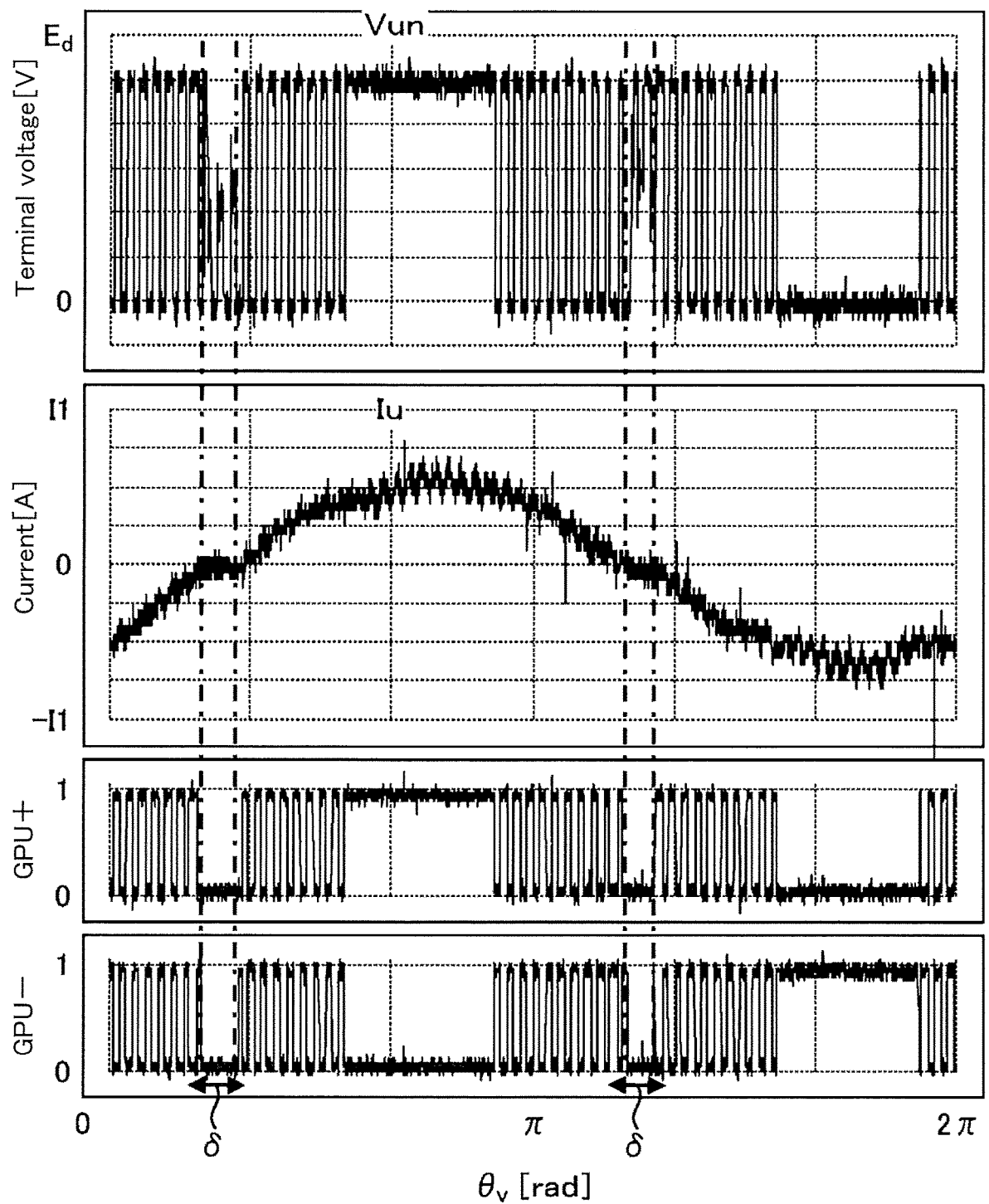
FIG. 18 shows waveforms a relation among a U-phase voltage, a U-phase current, and pulse signals when an actual device is driven.

FIG. 18 shows waveforms showing a relation among a U-phase voltage, a U-phase current, and pulse signals when an actual device is driven including the inverter 3a according to the present embodiment, where the axes of abscissa represents the voltage phase, and the axes of ordinate represents the voltage, the current and levels of pulse signals. More specifically, FIG. 18 shows the voltage, the current, and the pulse signals when the phase pulse stop interval is set in the two-phase modulation type PWM control method by a technology of providing the phase pulse stop interval around the zero-cross points of the current according to the first embodiment.

A first graph of FIG. 18 shows a U-phase terminal voltage Vun of the power converting circuit 31, and a second graph of FIG. 18 shows the U-phase AC current Iu flowing in a AC motor 3. A third graph of FIG. 18 shows the pulse signal GPU+, and a fourth graph of FIG. 18 shows a GPU− signal.

As shown in the third graph of FIG. 18, in the interval sandwiched between chain lines (indicated with δ), switching signal of both the pulse signals GPU+, GPU− are turned off, and it can be confirmed that the phase pulse stop interval δ is provided. Further, because the phase pulse stop interval δ is provided, it can be also confirmed that the U-phase AC current Iu is zero in the interval sandwiched by the chain lines.

Advantageous Effect by Intermittent Energization

Figure 19:
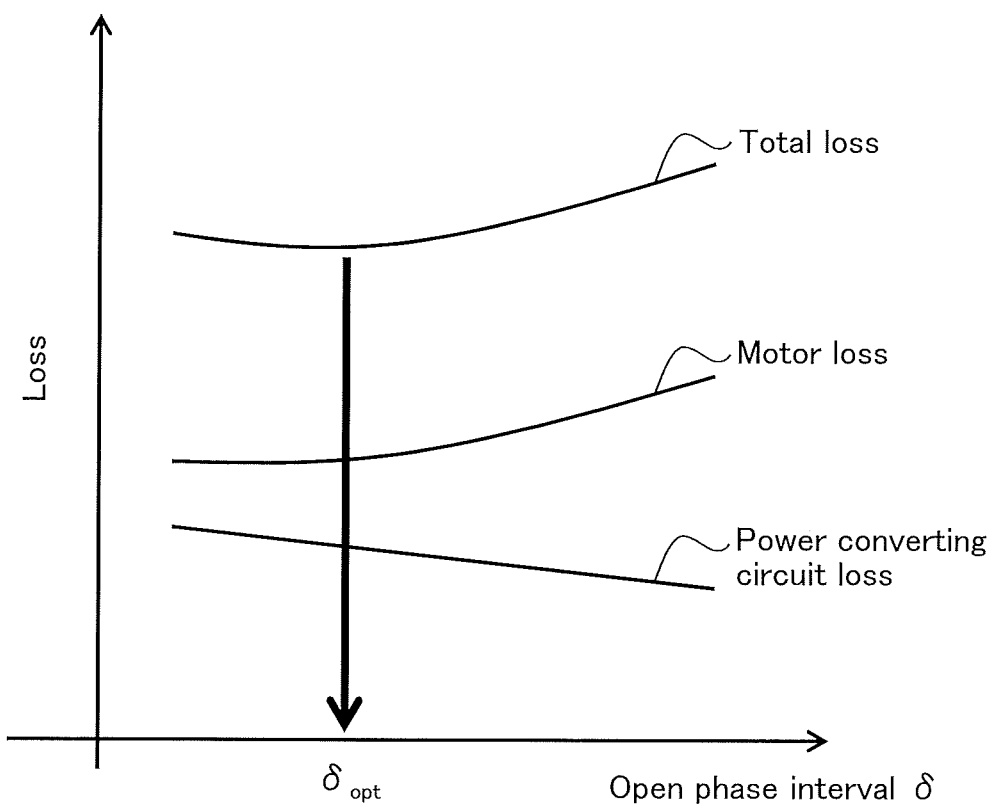
FIG. 19 is a characteristic drawing showing a relation among a power conversion circuit loss for a phase pulse stop interval (open phase interval) δ and a motor loss by an inverter intermittent energization operation and a total loss derived by adding them.

FIG. 19 is a characteristic drawing showing a relation among a power conversion circuit loss for a phase pulse stop period (open phase period) δ by the intermittent energization with the inverter 3a, and a total loss derived by adding them. The characteristic drawing represents the phase pulse stop interval (open phase interval) δ on the axis of abscissa and the loss on the axis of ordinate. More specifically, FIG. 19 shows the phase pulse stop interval δ set by the pulse stop controller 192 and the loss in the inverter 3a, and a loss in the AC motor (the motor 4a), and a total loss characteristic derived by summing the two losses.

As shown in FIG. 19, because the loss (power converting circuit loss) of the inverter 3a according to the present embodiment decreases as decrease in the number of times of switching as increases in the phase pulse stop interval δ. Further the loss (motor loss) of the motor 4a (AC motor) largely increases because harmonic components of the current increases by provision of the phase pulse stop interval δ. Further, increase in the phase pulse stop interval δ increases the harmonic components of the current remarkably, so that the loss (motor loss) of the motor 4a (AC motor) caused by this reason also increases remarkably. Accordingly, as shown in FIG. 19, the total loss of these two losses (power conversion circuit loss and the motor loss) are summed, and there is the phase pulse stop interval δopt in which the total loss becomes smallest, the total loss being derived by summing these losses (power converting circuit loss and the motor loss). Setting the phase pulse stop interval δ to the phase pulse stop interval δopt can decrease the entire loss of the power converter 1.

As described above, using the pulse stop controller 192 can reduce the number of times of switching of the pulse signal for PWM control using the pulse stop controller 192. In other words, when the pulse stop controller 192 operated under control of the microcomputer is configured as software, it is possible to reach a high efficiency of the power converter 1 without addition of a new hardware without modification in the configuration of the inverter 3a. Further, because the switching operation around the zero-cross of the current of the motor 4a is stopped, it is possible to suppress increase in the torque pulsation for the 150-degree energization method.

Figure 20:
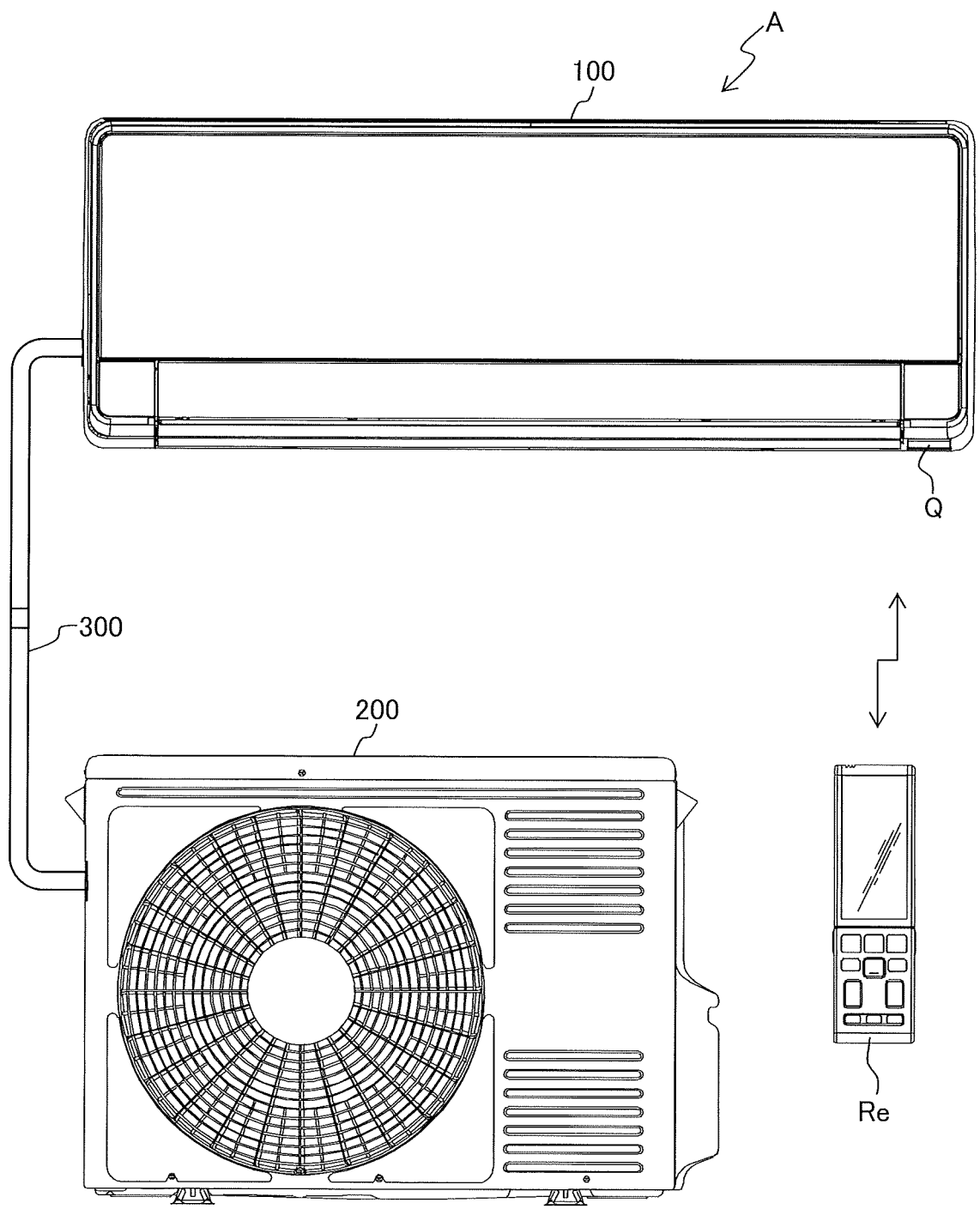
FIG. 20 is a front view of an indoor device, an outdoor device, and a remote controller of the air conditioning device according to the embodiment of the present invention.

FIG. 20 is a front view of an indoor device 100, an outdoor device 200, and a remote controller of the air conditioning device A according to the embodiment of the present invention.

As shown in FIG. 20, an air conditioner A is one type of refrigeration air conditioners, so-called a room air conditioner. The air conditioner A includes an indoor device 100, an outdoor device 200, a remote controller Re, the converter 2, the inverters 3a, 3b shown in FIG. 1. The indoor device 100 and the outdoor device 200 are connected with refrigerant tubes 300 which perform air-conditioning a room in which the indoor device 100 is installed through the known refrigeration cycle. Further, the indoor device 100 and the outdoor device 200 transmit and receive information each other through a communication cable (not shown). Further, the outdoor device 200 is connected with wiring (not shown) to be supplied with an AC voltage through the indoor device 100. The power converter 1 (see FIG. 1) is installed in the outdoor device 200 and converts the AC power supplied from the side of the indoor device 100 into the DC power.

The remote controller Re is operated by a user and transmits an infrared signal to a remote controller signal transmitting and receiving section Q of the indoor device 100. Contents of the infra-red signal is a command for requesting operation, change of setting temperature, a timer, change of the operation mode, a request for stop, etc. The air conditioner A performs airconditioning operations in a cooling mode, a heating mode, a dehumidifying mode, etc on the basis of the command in the infra-red signal. Further, the indoor device 100 transmits room temperature information, humidity information, an electrical charge to the remote controller Re from the remote controller signal transmitting and receiving section Q.

A flow of operation in the power converter 1 installed in the air conditioner A is described below. The power converter 1 performs boosting the DC voltage Vd with reduction in the harmonic component current by increased efficiency operation and improvement in the power factor and conversion into the AC power to drive the motors 4a, 4b. The converter 2 includes as described above four operation modes, i.e., the diode rectification operation, the synchronous rectification operation, the high speed switching operation, and the partial switching operation.

The loads H are the inverters 3a, 3b and the motors 4a, 4b. When the load is small and high efficiency operation is required, it is preferable to operate the converter 2 in the synchronous rectification mode.

When the load is large and it is required to secure boosting and a high power factor, it is preferable to control the converter 2 to perform high speed switching. Further, when the boosting and security of the power factor are required though the load is not so large like the rated operation of the air conditioner A, it is preferable to perform the partial switching operation. Further, when the partial switching and the high speed switching are performed, either of the diode rectification operation and the synchronous rectification operation is further combined.

Figure 21:
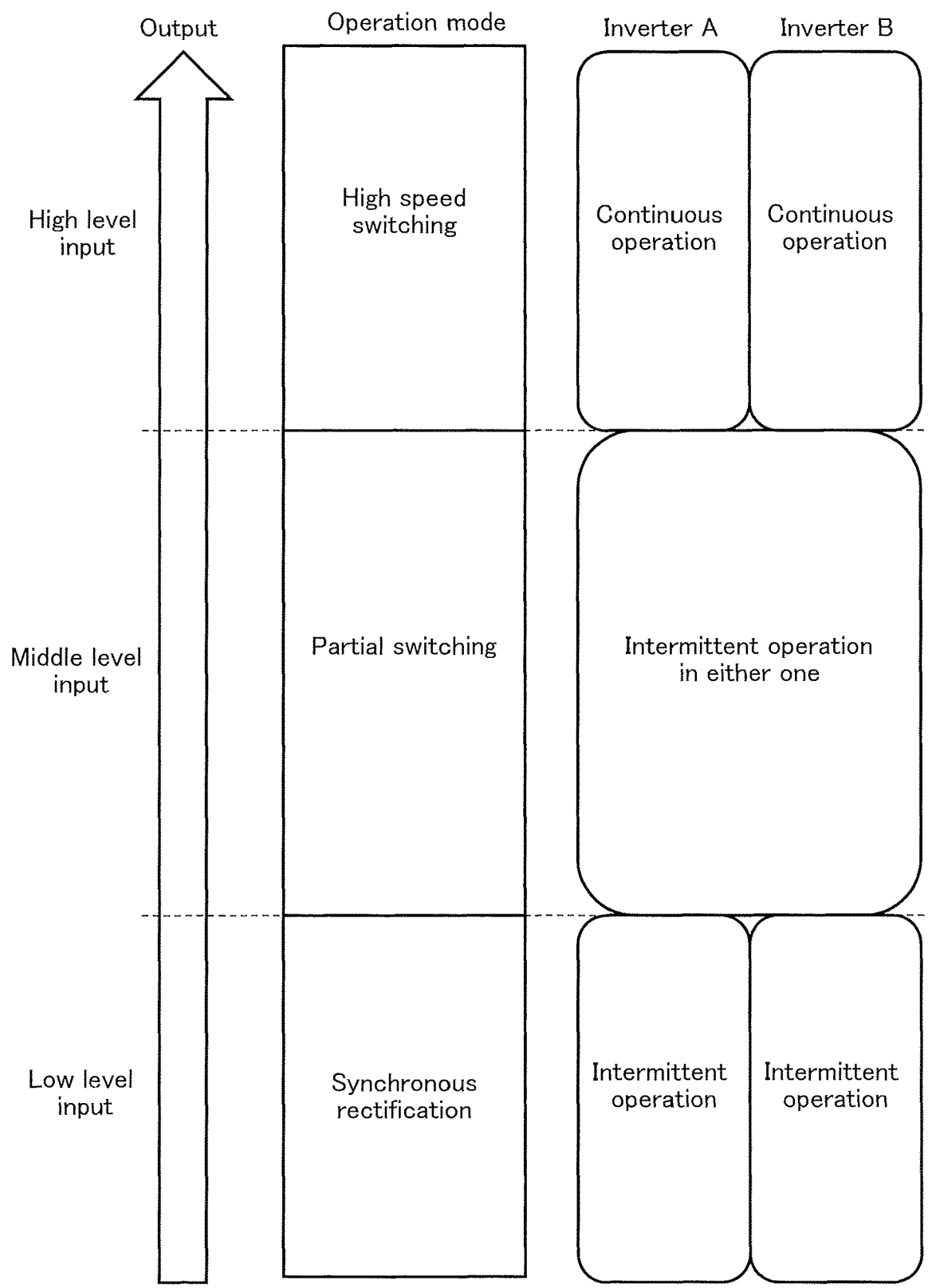
FIG. 21 is an outline drawing illustrating states of switching from the operation mode of a converter and an operation mode of the inverter.

FIG. 21 shows states of switching the operation modes of the converter 2 and the inverters 3a, 3b.

The converter 2 for converting the power source voltage into the DC voltage performs rectification and boosting operation in three operation modes as follows:

The rectification operation is an operation mode for performing only rectification operation without performing the shorting operation in which the power supplied from the AC power source VS is lower than that in the other modes. Because the number of times of switching is small in the rectification operation, the conversion efficiency of the converter 2 is largest as compared with other modes. In the rectification operation, an operation load on the microcomputer of control by the converter 2 is smallest as compared with other modes.

The partial switching operation is an operation mode of performing the shorting operation of a plurality times (one to ten times) per one cycle of the power source voltage and the rectification operation alternately. The power inputted from the AC power source VS in this mode is higher than that in the rectification operation and lower than that in the high speed switching operation. In the partial switching operation, the controller 5 uses the DTC function of the microcomputer to output pulses at predetermined timing.

The high speed switching operation is an operation mode performing the shorting operation and the rectification operation alternately in the PWM cycle (higher than several KHz). The power inputted from the AC power source VS is higher than other modes. On the other hand, because the number of times of switching is large in the high speed switching operation and the shorting operation is performed many times, the boosting performance increasing the DC voltage of the converter 2 and a suppressing effect of the harmonic components are higher than those in other modes. In the high speed switching operation, the operation load on the microcomputer of the control of the converter 2 is largest as compared with other modes.

Annual Performance Factor

In the embodiment, when the output is low, i.e., in an intermediate condition on the basis of APF (Annual Performance Factor) standard, the converter 2 performs the rectification operation. When the output is at a middle range, i.e., at the rated condition on the basis of the APF standard, the converter 2 performs the partial switching operation.

When the output is at a high range, i.e., in a low heating power condition on the basis of the APF standard, the converter 2 performs the high speed switching operation. Accordingly the converter 2 boosts the DC voltage and can drive a permanent magnet motor at a high efficiency.

When the controller 5 is provided with two inverters 3a, 3b, the controller 5 controls the converter 2 to perform the boosting operation and the inverters 3a, 3b to perform the intermittent energization operation linkingly. Because the intermittent energization operation has a high effect in increasing efficiency, when the intermittent energization is performed when the output level is low, this provides a high effect in improved efficiency. However, to output the pulse at predetermined timing, the DTC function of the microcomputer is used. Accordingly, it is necessary to determine whether the inverters 3a, 3b are operated in the intermittent energization operation or not and whether the converter 2 is operated in the partial switching operation due to a limit of the number of channels of the DTC function of the microcomputer.

In the embodiment, the operation mode of the converter 2 and presences of the intermittent energization operation of the inverter A (inverter 3a) and the inverter B (inverter 3b) are combined as shown in FIG. 21.

When the output level is low, the controller 5 controls the inverters 3a, 3b to perform the intermittent energization and the converter 2 to perform the rectification operation using two channels of DTC function.

When the output is in a middle range, the controller 5 controls either of the inverters 3a, 3b to perform the intermittent energization using one channel of the DTC function and the converter 2 to perform the partial switching operation using one channel of the DTC unction.

When the output level is high, the controller 5 controls the inverters 3a, 3b in general operation and the converter 2 to perform the high speed switching operation. The controller 5 does not use the DTC function.

As described above, the controller 5 can drive the permanent magnet synchronous motor in accordance with the input by performing the boosting operation of the converter 2 and the intermittent energization of the inverters 3a, 3b linkingly, so that the permanent magnet motor can be driven at a high efficiency in accordance with the input.

Modification

The present invention is not limited to the above-described embodiment and has various modifications. For example, the above-described embodiments have been described in detail to have easy understanding, but not limited to the power converter and refrigeration air conditioner including all elements described above. It is possible to replace a part of the configuration of an embodiment with a part of configuration of another embodiment and also add a part of the configuration of one embodiment to configuration of another embodiment. Further, it is possible to add to, omit, or replace with configuration of another configuration.

It is possible to provide respective configurations, functions, processing sections, processing means by hardware such as an integrated circuit. It is possible to provide respective configurations, functions, processing sections, processing means by software, i.e., interpret a program providing respective functions and conduct the program partially or entirely. The information such as a program, a table, a file for providing respective functions can be stored in a recording medium such as a flash memory card, a DVD (Digital Versatile Disk).

In the respective embodiments, the control line and data line are shown in figures for only necessary part, and it is not always to show all control lines and data lines in the product. Actually, almost all elements are connected with each other.

As modifications, for example there are modifications (a) to (c).

(a) The microcomputer for the controller in the above-described embodiments controls the inverter to perform the intermittent energization operation using the DTC function and the converter to perform the partial switching operation. However, the present invention is not limited to this, and it is possible to control the converter to perform the partial switching operation if the microcomputer includes DMAC (Direct Memory Access Controller) function, the microcomputer controls the inverter to perform the intermittent energization operation and the converter to perform the partial switching operation.

(b) The number of the inverters is not limited to two, but may be one or three or more.

(c) The converter is not limited to above-described embodiments and may have configuration in which a reactor and the switching elements are provided after the rectification bridge of diodes.

DESCRIPTION OF REFERENCE SYMBOLS 1 power converter
10 bridge rectifying circuit
11 current detector
12 gain controller
13 AC voltage detector
14 zero-cross determining section
15 phase current detector
15a phase current detector
15b phase current detector
16 boosting ratio controller
17 DC voltage detector
18 converter controller
19 load controller
19a load controller
19b load controller
191 vector controller
192 pulse stop controller
193 pulse controller
2 converter
3a, 3b inverter
31 power converting circuit
32 gate driver
4a, 4b motor
5 controller
L1 reactor
C1 smoothing capacitor
D1 to D4 diode
Q1, Q2 MOSFET
Q3 to Q8 switching element
VS AC power source
H load
A air conditioner (refrigeration air conditioner)

100 indoor device
200 outdoor device
Re remote controller
Q MOSFET
300 refrigerant tube

The invention claimed is:

1. A power converter comprising:
   a converter, including two metal-oxide-semiconductor field-effect transistors (MOSFETs), that is configured to output a boosted direct current (DC) voltage that is boosted by a switching operation of the two MOSFETs that combines a short-circuit operation and a rectification operation within a cycle of an alternating current (AC) power source through a reactor;
   an inverter, connected to a motor of an air-conditioner, configured to perform intermittent energization to turn off switching near a zero cross of a motor current when converting the DC voltage output by the converter into three-phase AC power; and
   a controller, connected to the converter and the inverter, configured to:
   control the converter to perform a partial switching operation in which the short-circuit operation of the switching operation is performed a predetermined number of times within a cycle of the AC power during the boosting of the DC voltage by the switching operation,
   control the inverter to perform the intermittent energization when the converter outputs the DC voltage by a synchronous rectification operation without performing the switching operation, and
   control the converter to not perform the intermittent energization when the converter outputs the DC voltage by the partial switching operation.

2. The power converter according to claim 1,
   wherein the rectification operation controls the converter to output DC voltage while the two MOSFETs are alternately switched on and off based on the polarity of the AC power source.

3. A power converter comprising:
   a converter, including two metal-oxide-semiconductor field-effect transistors (MOSFETs), that is configured to output a boosted direct current (DC) voltage that is boosted by a switching operation of the two MOSFETs that combines a short-circuit operation and a rectification operation within a cycle of an alternating current (AC) power source through a reactor;
   a first inverter and a second inverter, each connected to a motor of an air-conditioner, and each configured to perform intermittent energization to turn off a switching near a zero cross of a motor current when converting the DC voltage output by the converter into three-phase AC power; and
   a controller, connected to the converter, the first inverter and the second inverter, configured to:
   control the converter to perform a partial switching operation in which the short-circuit operation of the switching operation is performed a predetermined number of times within a cycle of the AC power during the boosting of the DC voltage by the switching operation,
   control the converter to perform a high speed switching operation in which th short-circuit operation of the switching operation is performed at a constant frequency within a cycle of the AC power during the boosting of the DC voltage by the switching operation,
   control the first inverter and the second inverter to perform the intermittent energization when the converter outputs the DC voltage by a synchronous rectification operation without performing the switching operation,
   control only one of the first inverter and the second inverter to perform the intermittent energization when the converter outputs the DC voltage by the partial switching operation, and
   control both of the first inverter and the second inverter to not perform the intermittent energization when the converter outputs the DC voltage by the high speed switching operation.

4. The power converter according to claim 3,
   wherein the rectification operation controls the converter to output DC voltage while the two MOSFETs are alternately switched on and off based on the polarity of the AC power source.

* * * * *